(12) United States Patent
Lakshmi Narayanan et al.

(10) Patent No.: US 10,860,873 B2
(45) Date of Patent: Dec. 8, 2020

(54) DRIVER BEHAVIOR RECOGNITION AND PREDICTION

(71) Applicant: Honda Motor Co., Ltd., Tokyo (JP)

(72) Inventors: Athmanarayanan Lakshmi Narayanan, Sunnyvale, CA (US); Yi-Ting Chen, Sunnyvale, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/438,119

(22) Filed: Jun. 11, 2019

(65) Prior Publication Data

US 2020/0089977 A1 Mar. 19, 2020

Related U.S. Application Data

(63) Continuation-in-part of application No. 16/132,950, filed on Sep. 17, 2018, now Pat. No. 10,482,334.

(51) Int. Cl.
*G06K 9/00* (2006.01)
*G06K 9/62* (2006.01)
*G06K 9/68* (2006.01)

(52) U.S. Cl.
CPC ..... *G06K 9/00845* (2013.01); *G06K 9/00791* (2013.01); *G06K 9/629* (2013.01); *G06K 9/68* (2013.01); *G06K 9/6257* (2013.01)

(58) Field of Classification Search
USPC ........................................................ 340/576
See application file for complete search history.

(56) References Cited

U.S. PATENT DOCUMENTS

2018/0165554 A1* 6/2018 Zhang .................. G06K 9/6256
2019/0012574 A1* 1/2019 Anthony .................. G06N 3/04
2019/0065872 A1* 2/2019 Yamanaka ............ B60W 40/09

OTHER PUBLICATIONS

G. Neuhold, T. Ollmann, S. R. Bulò, and P. Kontschieder, "The Mapillary Vistas Dataset for Semantic Understanding of Street Scenes," in ICCV, pp. 5000-5009, 2017.
Newcomb, D., "New Technology May Prevent Accidents by Reading Drivers' Body Language," https://www.forbes.com/sites/dougnewcomb/2015/04/22/new-technology-looks-inward-to-prevents-accidents-by-reading-drivers-body-language/#4a1c560d28b5.

(Continued)

*Primary Examiner* — Fabricio R Murillo Garcia
(74) *Attorney, Agent, or Firm* — Rankin, Hill & Clark LLP

(57) ABSTRACT

Driver behavior recognition or driver behavior prediction are described herein. A first image sequence including image frames associated with a forward-facing image capture device of a vehicle and a corresponding vehicle data signal sequence may be received. A second image sequence including image frames associated with a rear or driver facing image capture device of the vehicle may be received. Feature vectors may be generated for respective sequences using neural networks, such as a convolutional neural network (CNN), a depth CNN, a recurrent neural network (RNN), a fully connected layer, a long short term memory (LSTM) layer, etc. A fusion feature may be generated by performing data fusion on any combination of the feature vectors. A predicted driver behavior may be generated based on the LSTM layer and n image frames on an image sequence and include x number of prediction frames.

20 Claims, 14 Drawing Sheets

(56) References Cited

OTHER PUBLICATIONS

J. Yue-Hei Ng, M. Hauskmecht, S. Vijayanarasimhan, O. Vinyals, R. Monga, and G. Toderici, "Beyond short snippets: Deep networkds for video classification," in Proceedings of the IEEE conference on computer vision and pattern recognition, pp. 4694-4702, 2015.
Nuria Oliver and Alex Pentand. Graphical Models for Driver Behavior Recognition in a SmartCar. In IV, 2000.
A. Palazzi, D. Abati, S. Calderara, F. Solera, and R. Cucchiara, "Predicting the Driver's Focus of Attention: the DR(eye)VE Project," IEEE Transactions on Pattern Analysis and Machine Intelligence, 2018.
Adam Paszke, Sam Gross, Soumith Chintala, Gregory Chanan, Edward Yang, Zachary DeVito, Zeming Lin, Alban Desmaison, Luca Antiga, and Adam Lerer. Automatic differentiation in PyTorch. In NIPS-W, 2017.
M. C. Potter and E. I. Levy, "Recognition memory for a rapid sequence of pictures," Journal of experimental psychology, vol. 81, No. 1, p. 10, 1969.
Siyuan Qi and Song-Chun Zhu. Intent-aware Multi-agent Reinfocement Learning. In ICRA, 2018.
Y. Qian, E. J. Almazan, and J. H. Elder, "Evaluating features and classifiers for road weather condition analysis," in Image Processing (ICIP), 2016 IEEE International Conference on, pp. 4403-4407, IEEE, 2016.
"Autonomous driving: how good is LiDAR under heavy rain or fog?," Quora. https://www.quora.com/Autonomous-driving-how-good-is-LiDAR-under-heavy-rain-or-fog.
V. Ramanishka, Y.-T. Chen, T. Misu, and K. Saenko, "Toward driving scene understanding: A dataset for learning driver behavior and causal reasoning," in Proceedings of the IEEE Conference on Computer Vision and Pattern Recognition, pp. 7699-7707, 2018.
M. Schmidt. U. Hofmann, and M. Bouzouraa. A Novel Goal Oriented Concept for Situation Representation for ADAS and Automated Driving. In ITSC, 2014.
H. G. Seif and X. Hu, "Autonomous driving in the iCityHD maps as a key challenge of the automotive industry," Engineering, vol. 2, No. 2, pp. 159-162, 2016.
R. R. Selvaraju, M. Cogswell, A. Das, R. Vedantam, D. Parikh, and D. Batra, "Grad-cam: Visual explanations from deep networks via gradient-based localization," in ICCV, pp. 618-626, 2017.
"LIDAR vs Radar for Applied Autonomy," Semcon. https://semcon.com/what-we-do/applied-autonomy/lidar-vs-radar-for-applied-autonomy/.
Zheng Shou, Junting Pan, Jonathan Chan, Kazuyuki Miyazawa, Hassan Mansour, Anthony Vetro, Xavier Giro-i Nieto, and Shih-Fu Chang. Online Action Detection in Untrimmed, Streaming Videos-Modeling and Evaluation. arXiv:1802.06822, 2018.
N. Shroff, P. Turaga, and R. Chellappa, "Moving vistas: Exploiting motion for describing scenes," in Computer Vision and Pattern Recognition (CVPR), 2010 IEEE Conference on, pp. 1911-1918, IEEE, 2010.
I. Sikirić, K. Brkić, J. Krapac, and S. Šegvić, "Image representations on a budget: Traffic scene classification in a restricted bandwidth scenario," in 2014 IEEE Intelligent Vehicles Symposium Proceedings, pp. 845-852, IEEE, 2014.
Christian Szegedy, Sergey Ioffe, and Vincent Vanhoucke. Inception-v4, Inception-ResNet and the Impact of Residual Connections on Learning. CoRR, 2016.
D. Tran, L. Bourdev, R. Fergus, L. Torresani, and M. Paluri, "Learning spatiotemporal features with 3d convolutional networks," in Proceedings of the IEEE international conference on computer vision, pp. 4489-4497, 2015.
D. Tran, H. Wang, L. Torresani, J. Ray, Y. LeCun, and M. Paluri, "A Closer Look at Spatiotemporal Convolutions for Action Recognition," in CVPR, 2018.
Chien-Yi Wang, Athma Narayanan, Abhisek Patil, and Yi-Ting Chen. A 3D Dynamic Scene Analysis framework for Development of Intelligent Transportation Systems. In IV, 2018.

L. Wang, S. Guo, W. Huang, Y. Xiong, and Y. Qiao, "Knowledge guided disambiguation for large-scale scene classification with multiresolution CNNs," IEEE Transactions on Image Processing, vol. 26, No. 4, pp. 2055-2068, 2017.
F.-Y. Wu, S.-Y. Yan, J. S. Smith, and B.-L. Zhang, "Traffic scene recognition based on deep CNN and VLAD spatial pyramids," in Machine Learning and Cybernetics (ICMLC), 2017 International Conference on, vol. 1, pp. 156-161, IEEE, 2017.
H. Xu, A. Das, and K. Saenko, "R-C3D: region convolutional 3d network for temporal activity detection," in IEEE Int. Conf. on Computer Vision (ICCV), pp. 5794-5803, 2017.
H. Xu, Y. Gao, F. Yu, and T. Darrell, "End-to-end learning of driving models from large-scale video datasets," arXiv preprint, 2017.
J. Yao, S. Fidler, and R. Urtasun, "Describing the scene as a whole: Joint object detection, scene classification and semantic segmentation," in Computer Vision and Pattern Recognition (CVPR), 2012 IEEE Conference on, pp. 702-709, IEEE, 2012.
F. Yu, A. Seff, Y. Zhang, S. Song, T. Funkhouser, and J. Xiao, "Lsun: Construction of a large-scale image dataset using deep learning with humans in the loop," arXiv preprint arXiv:1506.03365, 2015.
F. Yu, W. Xian, Y. Chen, F. Liu, M. Liao, V. Madhavan, and T. Darrell, "Bdd100k: A diverse driving video database with scalable annotation tooling," arXiv preprint arXiv:1805.04687, 2018.
Wei Zhan, Changliu Liu, Ching-Yao Chan, and Masayoshi Tomizuka. A Non-conservatively Defensive Strategy for Urban Autonomous Driving. In ITSC, 2016.
J. Zhang, S. A. Bargal, Z. Lin, J. Brandt, X. Shen, and S. Sclaroff, "Top-down neural attention by excitation backprop," International Journal of Computer Vision, vol. 126, No. 10, pp. 1084-1102, 2018.
B. Zhou, A. Khosla, A. Lapedriza, A. Oliva, and A. Torralba, "Learning deep features for discriminative localization," in Proceedings of the IEEE Conference on Computer Vision and Pattern Recognition, pp. 2921-2929, 2016.
B. Zhou, A. Lapedriza, A. Khosla, A. Oliva, and A. Torralba, "Places: A 10 million image database for scene recognition," IEEE transactions on pattern analysis and machine intelligence, 2017.
Tinghui Zhou, Matthew Brown, Noah Snavely, and David G. Lowe. Unsupervised Learning of Depth and Ego-Motion from Video. In CVPR, 2017.
Pulkit Agrawal, Joao Carreira, and Jitendra Malik. Learning to See by Moving. In ICCV; 2015.
Ioan Andrei Barsan, Peidong Liu, Marc Pollefeys, and Andreas Geiger. Robust Dense Mapping for Large-Scale Dynamic Environments. In ICRA, 2018.
Bijelic, M., Mannan, F., Gruber, T., Ritter, W., Dietmayer, K., Heide, F., "Seeing Through Fog Without Seeing Fog: Deep Sensor Fusion in the Absence of Labeled Training Data," arXiv:1902.08913v1, Feb. 24, 2019. https://arxiv.org/pdf/1902.08913.pdf.
A. Bolovinou, C. Kotsiourou, and A. Amditis, "Dynamic road scene classification: Combining motion with a visual vocabulary model," in Information Fusion (FUSION), 2013 16th International Conference on, pp. 1151-1158, IEEE, 2013.
H. Brugman, A. Russel, and X. Nijmegen, "Annotating Multimedia/Multi-modal Resources with ELAN," in LREC, 2004.
Y.-W. Chao, S. Vijayanarasimhan, B. Seybold, D. A. Ross, J. Deng, and R. Sukthankar, "Rethinking the Faster R-CNN Architecture for Temporal Action Localization," in Proceedings of the IEEE Conference on Computer Vision and Pattern Recognition, pp. 1130-1139, 2018.
L.-C. Chen, G. Papandreou, I. Kokkinos, K. Murphy, and A. L. Yuille, "Deeplab: Semantic image segmentation with deep convolutional nets, atrous convolution, and fully connected crfs," IEEE transactions on pattern analysis and machine intelligence, vol. 40, No. 4, pp. 834-848, 2018.
Y. Chen, J. Wang, J. Li, C. Lu, Z. Luo, H. Xue, and C. Wang, "LiDAR—Video Driving Dataset: Learning Driving Policies Effectively," in Proceedings of the IEEE Conference on Computer Vision and Pattern Recognition, pp. 5870-5878, 2018.
M. Cordts, M. Omran, S. Ramos, T. Rehfeld, M. Enzweiler, R. Benenson, U. Franke, S. Roth, and B. Schiele, "The cityscapes dataset for semantic urban scene understanding," in Proceedings of the IEEE conference on computer vision and pattern recognition, pp. 3213-3223, 2016.

(56) References Cited

OTHER PUBLICATIONS

Roeland De Geest, Efstratios Gavves, Amir Ghodrati, Zhenyang Li, Cees Snoek, and Tinne Tuytelaars. Online Action Detection. In ECCV, 2016.
J. Deng, W. Dong, R. Socher, L.-J. Li, K. Li, and L. Fei-Fei, "Imagenet: A large-scale hierarchical image database," in Computer Vision and Pattern Recognition, 2009. CVPR 2009. IEEE Conference on, pp. 248-255, Ieee, 2009.
Nachiket Deo and Mohan Trivedi. Learning and Predicting On-road Pedestrian Behavior Around Vehicles. In ITSC, 2017.
Anup Doshi and Mohan M. Trivedi. Tactical Driver Behavior Prediction and Intent Inference: A Review. In ITSC, 2011.
Kiana Ehsani, Hessam Bagherinezhad, Joseph Redmon, Roozbeh Mottaghi, and Ali Farhadi. Who Let The Dogs Out? Modeling Dog Behavior From Visual Data. CVPR, 2018.
C. Feichtenhofer, A. Pinz, and R. P. Wildes, "Dynamic scene recognition with complementary spatiotemporal features," IEEE transactions on pattern analysis and machine intelligence, vol. 38, No. 12, pp. 2389-2401, 2016.
C. Feichtenhofer, A. Pinz, and A. Zisserman, "Convolutional two-stream network fusion for video action recognition," in Proceedings of the IEEE Conference on Computer Vision and Pattern Recognition, pp. 1933-1941, 2016.
G. Floros, B. van der Zander, and B. Leibe, "Openstreetslam: Global vehicle localization using openstreetmaps," in ICRA, vol. 13, pp. 1054-1059, 2013.
S. Garg, N. Suenderhauf, and M. Milford, "Don't Look Back: Robustifying Place Categorization for Viewpoint- and Condition-Invariant Place Recognition," in IEEE International Conference on Robotics and Automation (ICRA), 2018.
A. Geiger, P. Lenz, and R. Urtasun, "Are we ready for autonomous driving? the kitti vision benchmark suite," in Computer Vision and Pattern Recognition (CVPR), 2012 IEEE Conference on, pp. 3354-3361, IEEE, 2012.
Caner Hazirbas, Lingni Ma, Csaba Domokos, and Daniel Cremers. FuseNet: Incorporating Depth into Semantic Segmentation via Fusion-based CNN Architecture. In ACCV, 2016.
He, Kaiming; Zhang, Xiangyu; Ren, Shaoqing; and Sun, Jian, "Deep residual learning for image recognition," in Proceedings of the IEEE conference on computer vision and pattern recognition, pp. 770-778, 2016.
Held and Hein, "Movement-produced stimulation in the development of visually guided behavior," Journal of comparative and physiological phychology, 1963.
S. Hochreiter and J. Schmidhuber, "Long short-term memory," Neural computation, vol. 9, No. 8, pp. 1735-1780, 1997.
J. Hu, L. Shen, and G. Sun, "Squeeze-and-excitation networks," arXiv preprint arXiv:1709.01507, vol. 7, 2017.
X. Huang, X. Cheng, Q. Geng, B. Cao, D. Zhou, P. Wang, Y. Lin, and R. Yang, "The apolloscape dataset for autonomous driving," arXiv preprint arXiv:1803.06184, 2018.
"The Ultimate Sensor Battle: Lidar vs. Radar," Intellias—Intelligent Software Engineering, Aug. 9, 2018. https://www.intellias.com/the-ultimate-sensor-battle-lidar-vs-radar/.
A. Jain, H. S. Koppula, B. Raghavan, S. Soh, and A. Saxena, "Car that knows before you do: Anticipating maneuvers via learning temporal driving models," in Proceedings of the IEEE International Conference on Computer Vision, pp. 3182-3190, 2015.
Ashesh Jain, Amir R. Zamir, Silvio Savarese, and Ashutosh Saxena. Structural-RNN: Deep Learning on Spatio-Temporal Graphs. In CVPR, 2016.
Dinesh Jayaraman and Kristen Grauman. Learning Image Representations Tied to Ego-motion. In ICCV, 2015.
P. Jonsson, "Road condition discrimination using weather data and camera images," in Intelligent Transportation Systems (ITSC), 2011 14th International IEEE Conference on, pp. 1616-1621, IEEE, 2011.
P. Jonsson, J. Casselgren, and B. Thörnberg, "Road surface status classification using spectral analysis of NIR camera images," IEEE Sensors Journal, vol. 15, No. 3, pp. 1641-1656, 2015.
A. Karpathy, G. Toderici, S. Shetty, T. Leung, R. Sukthankar, and L. Fei-Fei, "Large-scale video classification with convolutional neural networks," in Proceedings of the IEEE conference on Computer Vision and Pattern Recognition, pp. 1725-1732, 2014.
Diederik Kingma and Jimmy Ba. Adam: A Method for Stochastic Optimization. In ICLR, 2014.
Alex Krizhevsky and Sutskever, Ilya and Hinton, Geoffrey E, "Imagenet classification with deep convolutional neural networks," in Advances in Neural Information Processing Systems 25 (F. Pereira, C. J. C. Burges, L. Bottou, and K. Q. Weinberger, eds.), pp. 1097-1105, Curran Associates, Inc., 2012.
Namhoon Lee, Wongun Choi, Paul Vernaza, Chistopher B. Choy, Philip H. S. Torr, and Manmohan Chandraker. DESIRE: Distant Future Prediction in Dynamic Scenes with Interacting Agents. In CVPR, 2017.
J. Levinson, M. Montemerlo, and S. Thrun, "Map-Based Precision Vehicle Localization in Urban Environments," in Robotics: Science and Systems, vol. 4, p. 1, Citeseer, 2007.
F. F. Li, R. VanRullen, C. Koch, and P. Perona, "Rapid natural scene categorization in the near absence of attention," Proceedings of the National Academy of Sciences, vol. 99, No. 14, pp. 9596-9601, 2002.
Ruiyu Li, Makarand Tapaswi, Renjie Liao, Jiaya Jia, Raquel Urtasun, and Sanja Fidler. Situation Recognition with Graph Neural Networks. In ICCV, 2017.
X. Li, Z. Wang, and X. Lu, "A Multi-Task Framework for Weather Recognition," in Proceedings of the 2017 ACM on Multimedia Conference, pp. 1318-1326, ACM, 2017.
D. Lin, C. Lu, H. Huang, and J. Jia, "RSCM: Region Selection and Concurrency Model for Multi-Class Weather Recognition," IEEE Transactions on Image Processing, vol. 26, No. 9, pp. 4154-4167, 2017.
T.-Y. Lin, M. Maire, S. Belongie, J. Hays, P. Perona, D. Ramanan, P. Dollár, and C. L. Zitnick, "Microsoft coco: Common objects in context," in European conference on computer vision, pp. 740-755, Springer, 2014.
Tsung-Yi Lin, Piotr Dollar, Ross Girshick, Kaiming He, Bharath Hariharan, and Serge Belongie. Feature Pyramid Networks for Object Detection. In CVPR, 2017.
Tsung-Yi Lin, Priya Goyal, Ross Girshick, Kaiming He, and Piotr Dollar. Focal Loss for Dense Object Detection. In ICCV, 2017.
Shugao Ma, Leonid Sigal, and Stan Sclaroff. Learning Activity Progression in LSTMs for Activity Detection and Early Detection. In CVPR, 2016.
W. Maddern, G. Pascoe, C. Linegar, and P. Newman, "1 year, 1000 km: The oxford robotcar dataset," The International Journal of Robotics Research, vol. 36, No. 1, pp. 3-15, 2017.
V. Madhavan and T. Darrell, The BDD-Nexar Collective: A Large-Scale, Crowsourced, Dataset of Driving Scenes. PhD thesis, Masters thesis, EECS Department, University of California, Berkeley, 2017.
Marmanis, Dimitrios; Wegner, Jan D; Galliani, Silvano; Schindler, Konrad; Datcu, Mihai; and Stilla, Uwe, "Semantic segmentation of aerial images with an ensemble of CNNs," ISPRS Annals of the Photogrammetry, Remote Sensing and Spatial Information Sciences, vol. 3, p. 473, 2016.
J. A. Montoya-Zegarra, J. D. Wegner, L. Ladický, and K. Schindler, "Semantic segmentation of aerial images in urban areas with class-specific higher-order cliques," ISPRS Annals of the Photogrammetry, Remote Sensing and Spatial Information Sciences, vol. 2, No. 3, p. 127, 2015.
Katsuyuki Nakamaura, Serena Yeung, Alexandre Alahi, and Li Fei-Fei. Jointly Learning Energy Expenditures and Activities using Egocentric Multimodal Signals. In CVPR, 2017.
Ann Neal. "LiDAR vs. RADAR," Sensors Online, Apr. 24, 2018. https://www.sensorsmag.com/components/lidar-vs-radar.
Office Acton of U.S. Appl. No. 16/132,950 dated Jul. 10, 2019, 22 pages.
Notice of Allowance of U.S. Appl. No. 16/132,950 dated Sep. 11, 2019, 16 pages.

\* cited by examiner

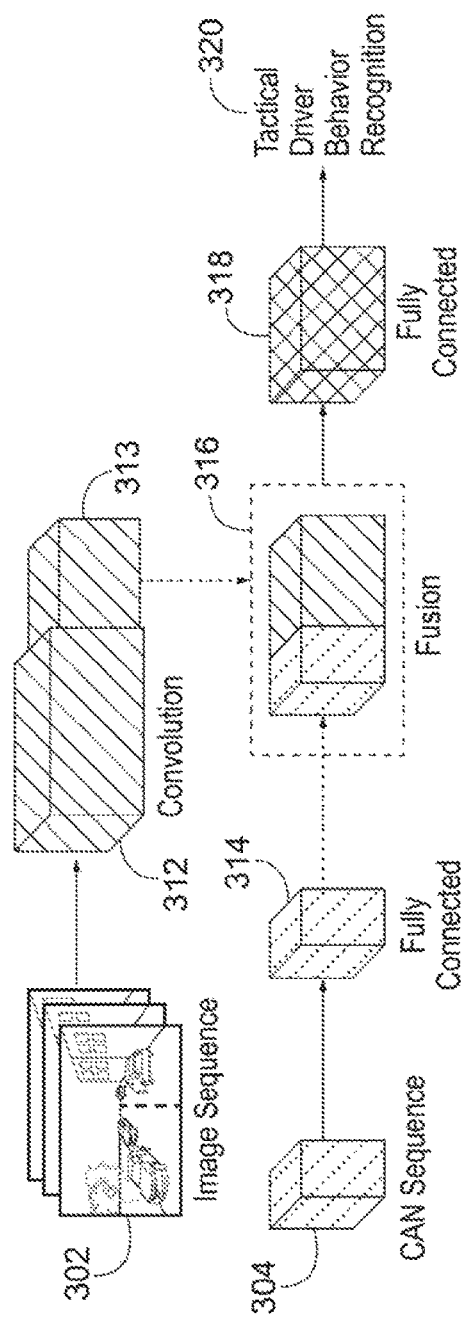
FIG. 3 (a) Early CNN Architecture
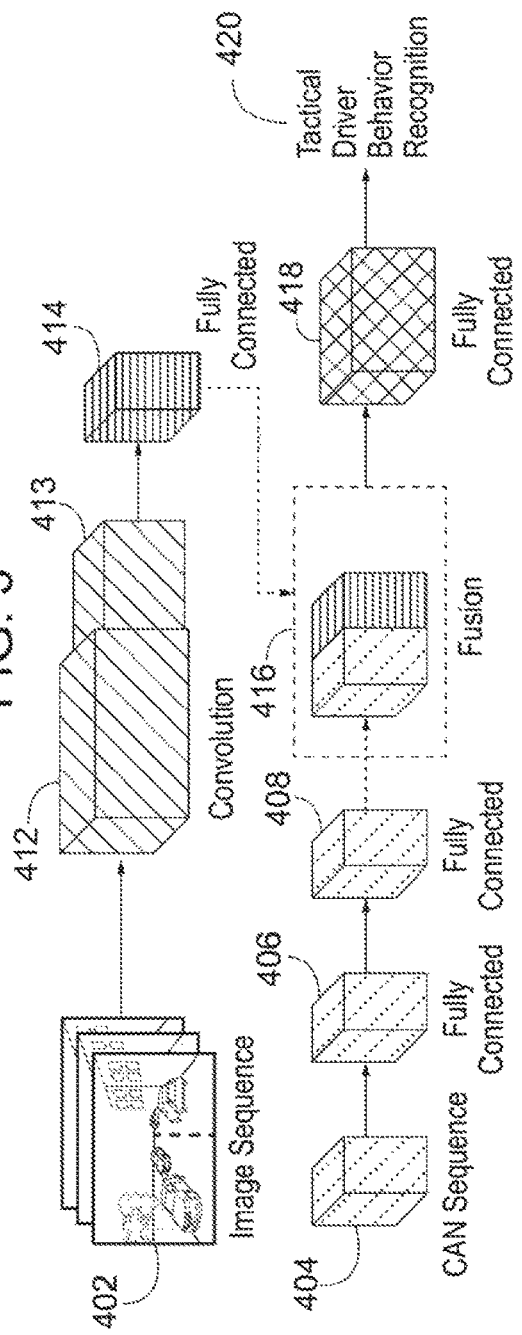
FIG. 4 (b) Late CNN Architecture

DRIVER BEHAVIOR RECOGNITION AND PREDICTION

BACKGROUND

It is still far from understood how human drivers interact with road users in complicated driving scenarios. Automated driving or autonomous vehicles may operate in highly interactive, challenging scenarios. While learning based algorithms may be used to search data sequences in association with these driving scenarios, these algorithms may not be able to perform optimally when labelled data is not provided.

BRIEF DESCRIPTION

According to one aspect, a system for driver behavior recognition may include a processor and a memory. The memory may receive or store an image sequence and a corresponding vehicle data signal sequence. The image sequence may include at least a first image frame and a second image frame. The vehicle data signal sequence may include vehicle data associated with the first image frame and vehicle data associated with the second image frame. The processor may generate or process features for each frame of the respective sequences. The processor may generate a first feature vector based on the image sequence and a first neural network including a feature pyramid network. The processor may generate a second feature vector based on a fully connected layer or a convolutional filter layer and the vehicle data signal sequence. The processor may generate a third feature vector based on the image sequence and a depth convolutional neural network (CNN). The processor may generate a fusion feature by performing data fusion based on the first feature vector, the second feature vector, and the third feature vector. The processor may process the fusion feature using a long short term memory (LSTM) layer and store the processed fusion feature as a recognized driver behavior associated with each corresponding frame.

The first neural network may be a CNN or a recurrent neural network (RNN). The first neural network may include an input layer, an output layer, and one or more hidden layers. The depth CNN may include an input layer, an output layer, and one or more hidden layers. The first feature vector may or may not be passed through or calculated based on the output layer of the first neural network. The third feature vector may or may not be passed through or calculated based on the output layer of the depth CNN. The performing data fusion may include performing addition or concatenation. The processor may batch normalize the processed fusion feature.

According to one aspect, a system for driver behavior recognition may include a processor and a memory. The memory may receive an image sequence and a corresponding vehicle data signal sequence. The image sequence may include at least a first image frame and a second image frame. The vehicle data signal sequence may include vehicle data associated with the first image frame and vehicle data associated with the second image frame. The processor may generate or process features for each frame of the respective sequences. The processor may generate a first feature vector based on the image sequence and a first neural network. The processor may generate a second feature vector based on a fully connected layer or a convolutional filter layer and the vehicle data signal sequence. The processor may generate a fusion feature by performing data fusion based on the first feature vector and the second feature vector. The processor may process the fusion feature using a long short term memory (LSTM) layer and store the processed fusion feature as a recognized driver behavior associated with each corresponding frame.

The first neural network may be a recurrent neural network (RNN). The first neural network may include an input layer, an output layer, and one or more hidden layers. The first feature vector may or may not be calculated based on the output layer of the first neural network. The performing data fusion may include performing addition or concatenation. The processor may process the fusion feature using a second fully connected layer. The first feature vector may be generated based on the image sequence, the first neural network, and a second fully connected layer. The first feature vector may be generated based on the image sequence, the first neural network, and a second LSTM layer. The second feature vector may be generated based on the fully connected layer, a second fully connected layer, and the vehicle data signal sequence.

According to one aspect, a method for driver behavior recognition may include receiving an image sequence and a corresponding vehicle data signal sequence. The image sequence may include at least a first image frame and a second image frame. The vehicle data signal sequence may include vehicle data associated with the first image frame and vehicle data associated with the second image frame. The method may include, for each frame of the respective sequences, generating a first feature vector based on the image sequence and a first neural network, generating a second feature vector based on a fully connected layer or a convolutional filter layer and the vehicle data signal sequence, generating a fusion feature by performing data fusion based on the first feature vector and the second feature vector, processing the fusion feature using a long short term memory (LSTM) layer, and storing the processed fusion feature as a recognized driver behavior associated with each corresponding frame.

The first neural network may include an input layer, an output layer, and one or more hidden layers. The method may include generating the first feature vector based on the image sequence and only the input layer and one or more of the hidden layers of the first neural network. The method may include generating the fusion feature based on addition data fusion or concatenation data fusion. The method may include generating the first feature vector based on the image sequence, the first neural network, and a second fully connected layer. The method may include generating the fusion feature by performing data fusion based on the first feature vector, the second feature vector, and a third feature vector. The third feature vector may be determined based on the image sequence and a depth convolutional neural network (CNN).

According to one aspect, a system for driver behavior recognition may include a memory, a processor, and a vehicle system. The memory may receive a first image sequence, a corresponding vehicle data signal sequence, and a second image sequence. The first image sequence may include at least a first image frame and a second image frame. The second image sequence may include at least a first image frame and a second image frame. The vehicle data signal sequence may include vehicle data associated with the first image frame of the first image sequence and vehicle data associated with the second image frame of the first image sequence. The processor may perform, for each frame of the respective sequences one or more of: generating a first feature vector based on the first image sequence and a first neural network, generating a second feature vector based on a fully connected layer or a convolutional filter layer and the vehicle data signal sequence, generating a third feature vector based on the first image sequence and a depth convolutional neural network (CNN), generating a fourth feature vector based on the second image sequence and a second neural network, generating a fusion feature by performing data fusion based on the first feature vector, the second feature vector, the third feature vector, and the fourth feature vector, processing the fusion feature using a long short term memory (LSTM) layer, and storing the processed fusion feature as a recognized driver behavior associated with each corresponding frame. The vehicle system may operate based on the recognized driver behavior associated with each corresponding frame.

The first neural network or the second neural network may be a CNN or a recurrent neural network (RNN). The first neural network may include an input layer, an output layer, and one or more hidden layers. The second neural network may include an input layer, an output layer, and one or more hidden layers. The depth CNN may include an input layer, an output layer, and one or more hidden layers. The first feature vector may not necessarily be passed through or calculated based on the output layer of the first neural network or otherwise be an intermediate product of the first neural network. The third feature vector may not necessarily be passed through or calculated based on the output layer of the depth CNN or otherwise be an intermediate product of the depth CNN. The performing data fusion may include performing addition or concatenation. The first image sequence may be received from a forward-facing image capture device of a vehicle and include image frames of an operating environment through which the vehicle is travelling. The second image sequence may be received from a rear-facing image capture device within a vehicle and include image frames of a driver of the vehicle.

According to one aspect, a system for driver behavior prediction may include a memory, a processor, and a vehicle system. The memory may receive a first image sequence, a corresponding vehicle data signal sequence, and a second image sequence. The first image sequence may include n image frames of at least a first image frame and a second image frame. The second image sequence may include at least a first image frame and a second image frame. The vehicle data signal sequence may include vehicle data associated with the first image frame of the first image sequence and vehicle data associated with the second image frame of the first image sequence. The processor may perform, for each frame of the respective sequences, one or more of: generating a first feature vector based on the first image sequence and a first neural network, generating a second feature vector based on a fully connected layer or a convolutional filter layer and the vehicle data signal sequence, generating a third feature vector based on the second image sequence and a second neural network, generating a fusion feature by performing data fusion based on the first feature vector, the second feature vector, the third feature vector, processing the fusion feature using a long short term memory (LSTM) layer to generate n+x resultant frames of a predicted driver behavior based on the n image frames of the first image sequence, wherein x is a number of prediction frames. The vehicle system may operate based on the predicted driver behavior.

The first neural network or the second neural network may be a CNN or a recurrent neural network (RNN). The first neural network may include an input layer, an output layer, and one or more hidden layers. The second neural network may include an input layer, an output layer, and one or more hidden layers. The first feature vector may not necessarily be passed through or calculated based on the output layer of the first neural network or otherwise be an intermediate product of the first neural network. The performing data fusion may include performing addition or concatenation. The first image sequence may be received from a forward-facing image capture device of a vehicle and includes image frames of an operating environment through which the vehicle is travelling. The second image sequence may be received from a rear-facing image capture device within a vehicle and includes image frames of a driver of the vehicle.

According to one aspect, a system for driver behavior prediction may include a memory, a processor, and a vehicle system. The memory may receive a first image sequence and a second image sequence. The first image sequence may include n image frames of at least a first image frame and a second image frame. The second image sequence may include at least a first image frame and a second image frame. The processor may perform, for each frame of the respective sequences, one or more of: generating a first feature vector based on the first image sequence and a first neural network, generating a second feature vector based on the second image sequence and a second neural network, generating a fusion feature by performing data fusion based on the first feature vector and the second feature vector, processing the fusion feature using a long short term memory (LSTM) layer to generate n+x resultant frames of a predicted driver behavior based on the n image frames of the first image sequence, wherein x is a number of prediction frames. The vehicle system may operate based on the predicted driver behavior.

The first neural network or the second neural network may be a CNN or a recurrent neural network (RNN). The first neural network may include an input layer, an output layer, and one or more hidden layers. The second neural network may include an input layer, an output layer, and one or more hidden layers. The first feature vector may not necessarily be passed through or calculated based on the output layer of the first neural network or otherwise be an intermediate product of the first neural network. The first image sequence may be received from a forward-facing image capture device of a vehicle and includes image frames of an operating environment through which the vehicle is travelling. The second image sequence may be received from a rear-facing image capture device within a vehicle and includes image frames of a driver of the vehicle.

BRIEF DESCRIPTION OF THE DRAWINGS

FIG. 3 is an exemplary architecture which may be implemented according to the system for driver behavior recognition of FIG. 1.

FIG. 4 is an exemplary architecture which may be implemented according to the system for driver behavior recognition of FIG. 1.

DETAILED DESCRIPTION

Figure 1:
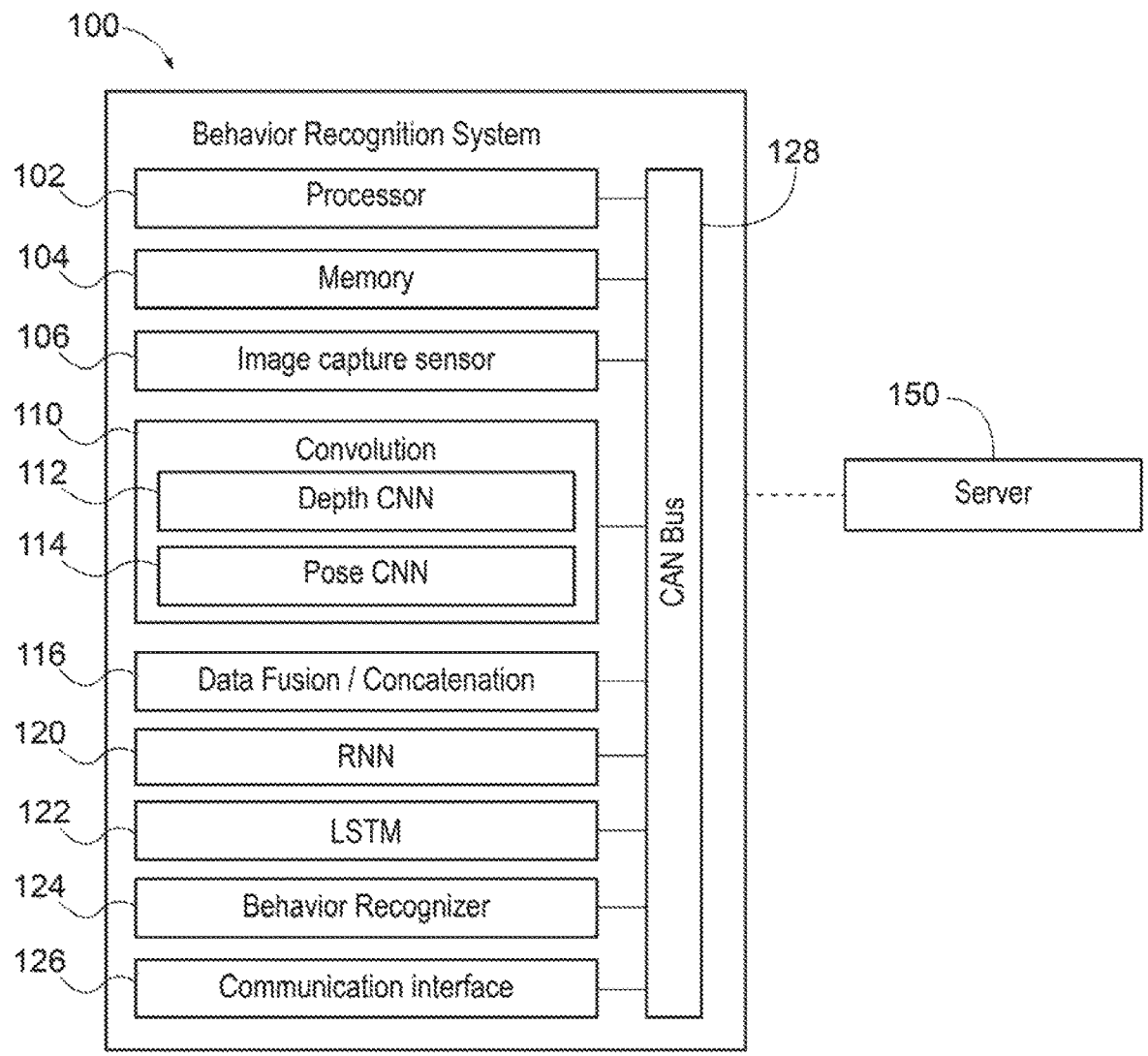
FIG. 1 is an exemplary block diagram of a system for driver behavior recognition, according to one aspect.

The following terms are used throughout the disclosure, the definitions of which are provided herein to assist in understanding one or more aspects of the disclosure.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle system", as used herein, may be any automatic or manual systems that may be used to enhance the vehicle, driving, and/or safety. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

A unified representation framework is proposed to enable the application of learning driving behavior or driver behavior recognition. This learning or behavior recognition may be based on three-dimensional (3D) semantic scene representations and multimodal data fusion of data from vehicle sensors, such as cameras or other sensors connected to a controller area network (CAN) bus of the vehicle, to detect tactical driver behaviors. For example, the semantic scene representations may include structure from motion or semantic context. 3D scene analysis (e.g., depth estimation), situation understanding or analysis, intention prediction, decision planning, and decision making may be contemplated.

Different types of driver behavior may be considered or modeled. For example, driver behavior may include a goal oriented behavior, a stimulus driven behavior, cause, and attention. Examples of each of the different types of driver behavior may be as follows. A vehicle turning left while yielding to another vehicle crossing an intersection. The left turn behavior in this example may be the goal oriented behavior or tactical driving behavior. As used herein, tactical driving behavior may mean or include goal oriented driving behavior or vice versa. The yielding to the other vehicle crossing the intersection may be the stimulus driven behavior. The crossing vehicle may be the cause of the yielding behavior. The driver of the vehicle may also pay attention to other items or objects in the driving scenario, such as a pedestrian, for example. However, this attention does not necessarily affect the driver behavior. The techniques and systems for driver behavior recognition described herein provide for receiving an input of an image sequence, such as a video feed, and a corresponding vehicle data signal sequence and outputting each frame with a corresponding tactical driver behavior, goal oriented behavior, or background class.

One of the advantages or benefits provided by this unified representation framework or the techniques and systems for driver behavior recognition described herein is that the issues of data scarcity for supervised learning algorithms may be alleviated or mitigated. In this regard, the systems and methods for driver behavior recognition have been shown to outperform baseline models, as will be described herein.

FIG. 1 is an exemplary block diagram of a system 100 for driver behavior recognition, according to one aspect. The system 100 for driver behavior recognition may include a processor 102, a memory 104, an image capture device 106, a convolutor 110 which may include a convolution neural network (CNN), such as a depth CNN unit 112 (which may be utilized to provide a depth estimation) or a pose CNN 114. The system 100 for driver behavior recognition may include a data fuser 116 or concatenator, a recurrent neural network (RNN) unit 120, which may include a long short term memory (LSTM) unit 122. The system 100 for driver behavior recognition may include a behavior recognizer 124, a communication interface 126, and a controller area network (CAN) bus 128. The communication interface 126 may perform computer communication or be communicatively coupled with a server 150.

According to one aspect, data from the image capture device 106 and other vehicle sensors obtained through the CAN bus 128 may be utilized to determine or infer tactical driver behaviors. Examples of information received from the other vehicle sensors may include a steering angle, yaw angle, accelerator information, velocity, brake pedal pressure, etc. The unified representation framework of the system 100 for driver behavior recognition may incorporate two or more modalities to capture visual appearances and vehicle dynamics of the associated vehicle. These cues or features may be sent through the LSTM unit 122 to encode temporal information.

In this way, the system 100 for driver behavior recognition may utilize 3D semantic scene cues for tactical driver behavior detection for the following reasons. Tactical driver behaviors may be defined by driver actions, which may be inferred based on 3D world road structures (e.g., a road divider, a shape of an intersection). Additionally, driving scenes may be defined by a road topology (e.g., road markings for stopping, turning, and lane changes) and traffic rules (e.g., traffic signs and traffic lights) as a regulation for human drivers.

Therefore, the system 100 for driver behavior recognition may generate 3D semantic scene representations based on the fusion of semantic context obtained from semantic segmentation (e.g., each pixel may be assigned a value, and pixels having the same value may be considered to be part of the same class, such as a road, a vehicle, the sky, a building, etc.) and a 3D scene structure extracted by an unsupervised learning based structure from a motion algorithm as one or more visual features. The 3D semantic scene representations may be fused with vehicle sensor features (e.g., vehicle dynamics or sensory features) to determine one or more tactical driver behaviors. In this way, the 3D semantic scene context and temporal dynamics may be formulated in a unified representation learning framework that is used to generate tactical driver behaviors for corresponding frames of an image sequence.

According to one aspect, image capture device 106 may capture an image sequence of an operating environment through which a vehicle is travelling. The image sequence may include a first image frame, a second image frame, a third image frame, etc. Concurrently, the CAN bus 128 of the vehicle may capture or gather corresponding vehicle data signals organized as a corresponding vehicle data signal sequence. The vehicle data signal sequence may correspond to the image sequence in that the vehicle data signal sequence may include vehicle data associated with the first image frame, vehicle data associated with the second image frame, vehicle data associated with the third image frame, etc. These sequences may be sent or transmitted to the memory 104. In other words, the memory 104 may receive the image sequence and the corresponding vehicle data signal sequence.

The convolutor 110, the data fuser 116, the RNN unit 120, and the behavior recognizer 124 may be implemented via the processor 102 and the memory 104. In this regard, the convolutor 110 may generate, on a frame by frame basis, a first feature vector based on the image sequence and a first neural network, which may include a feature pyramid network. Stated another way, for each image frame of the image sequence, the convolutor 110 may generate a first feature vector for that frame based on the current frame of the image sequence and the first neural network. The CNN of the convolutor 110 may include an input layer, an output layer, and one or more hidden layers, which may be convolutional filters.

The processor 102 may generate, on a frame by frame basis, a second feature vector based on a fully connected layer and the vehicle data signal sequence. Stated another way, the processor 102 may feed frames of the vehicle data signal sequence (CAN bus sequence) through the fully connected layer to obtain the second feature vector, where each image frame may be associated with its own set of first, second, third, etc. feature vectors and vehicle data. In this way, the processor 102 may generate the first feature vector, the second feature vector, the third feature vector, etc. for each frame of the respective sequences (i.e., image sequence and vehicle data signal sequence, which are associated with a number of frames).

According to one aspect, a three-stream architecture may be implemented, and the depth CNN unit 112 may generate the third feature vector based on the image sequence and a depth CNN. After an image frame is passed through the depth CNN by the processor 102, each pixel in the image frame may be assigned or associated with a value which is indicative of a depth estimation.

The system 100 for driver behavior recognition may receive or derive 3D scene structure information, semantic context information, and vehicle dynamics information, and fuse this information together to determine the tactical driver behavior. Different types of data fusion may be utilized. For example, the data fuser 116 may perform data fusion by performing addition or concatenation. According to one aspect, feature vectors may be concatenated by the data fuser 116, and batch normalized (via the processor 102). According to one aspect, the 3D scene structure and semantic context features may be added prior to concatenation with the vehicle data or CAN bus features. According to one aspect, the semantic context features (e.g., from the CNN or a feature pyramid network) and the 3D scene structure features may be separately convolved by 1×1 convolution kernels, followed by an addition operation. According to one aspect, the sum operation may be the data fusion technique utilized by the data fuser 116. The sum operation may transfer the discriminated power from the depth features while further enhancing the performance by using semantic segmentation features.

Regardless of the fusion technique utilized, the data fuser 116 may generate the fusion feature by performing data fusion based on the first feature vector and the second feature vector. According to one aspect where the three-stream architecture is implemented, the data fuser 116 may generate the fusion feature by performing data fusion (e.g., addition data fusion or concatenation data fusion) based on the first feature vector, the second feature vector, and the third feature vector.

According to one aspect, the CNN unit may process the fusion feature based on a second fully connected layer. According to another aspect, the RNN unit 120 may process the fusion feature using a LSTM layer via the LSTM unit 122. After processing or after fusion, the fusion feature or processed fusion feature may be stored by the behavior recognizer 124 to the memory 104, as a recognized driver behavior associated with each corresponding frame.

As will be seen below, the first neural network may be a CNN (e.g., FIGS. 3-4) or an RNN (e.g., FIGS. 5-7). Regardless of how the neural network (e.g., first neural network, second, third, pose, depth, etc.) is implemented (i.e., as the CNN, depth CNN, pose CNN, or as the RNN), the neural network may include an input layer, an output layer, one or more hidden layers, one or more filter layers (e.g., convolutional filters or other filter, etc.).

Additionally, as will be discussed in greater detail below and with regard to the early data fusion, the aforementioned feature vectors (e.g., the first feature vector, the second feature vector, the third feature vector, etc.) may be generated based on an intermediate step or phase of the neural network (e.g., first neural network, etc.). In other words, a neural network, such as the CNN, may include or comprise the input layer, the additional or hidden layers, and the output layer. According to one aspect, the feature vector (e.g., the first feature vector, the second feature vector, the third feature vector, etc.) may be generated in a manner where the feature vector is not passed through or is not calculated based on the output layer of the neural network. For example, the first feature vector may not be passed through or calculated based on the output layer of the first neural network. As another example, the third feature vector may not be passed through or calculated based on the output layer of the depth CNN.

Stated another way, the processor 102 or the CNN unit 110 may generate the first feature vector based on the image sequence and only the input layer and one or more of the hidden layers of the first neural network (and not the output layer of the first neural network). Explained yet again, one or more of the feature vectors generated herein (e.g., the first feature vector, the second feature vector, the third feature vector, the semantic feature vector, the vehicle signal feature vector, the depth feature vector, etc.) may be generated merely from one or more intermediate layers of a neural network (e.g., CNN, RNN, depth CNN, etc.) rather than allowing the neural network to process the feature vector using the output layer. In this way, unique data fusion is provided herein to enable tactical driver behavior recognition to be determined.

The features from the aforementioned cues or information are utilized, rather than features trained based on direct supervision of tactical driver behavior labels, thereby mitigating the need for labelled data. According to one aspect, features for semantic context may be derived using auxiliary supervised semantic segmentation. Features for the 3D scene structure may be derived using unsupervised structure from motion or (e.g., motion video, which may be a sequence of if image frames). Structure from motion (SFM) may be implemented to understand how the vehicle moved by taking the motion video as an input and generating a depth of an object around the vehicle. In this way, the input motion video or image frames thereof may be fed to a SFM algorithm, which may determine the depth of the object accordingly. If the vehicle moves forward by one meter, a tree on the left may be determined to be a farther distance away, such as by one meter, and the depth of the tree may be determined accordingly.

For example, the input may be untrimmed, egocentric sequences of video from the image capture device 106 and CAN signals from the CAN bus 128, while the output may be the tactical driver behavior label of each corresponding image frame. Examples of tactical driver behavior labels may include intersection passing, turning right, turning left, right lane change, left lane change, U turn, left branch, right branch, crosswalk passing, railroad passing, merge, intersection passing, etc.

The recognized driver behavior associated with each corresponding frame may be passed on or transmitted via the communication interface 126 of the system 100 for driver behavior recognition to the server 150, and stored as a driver behavior recognition database indicative of recognized driver behavior, given the input of the image frame from the image sequence and CAN bus signal data.

Figure 2:
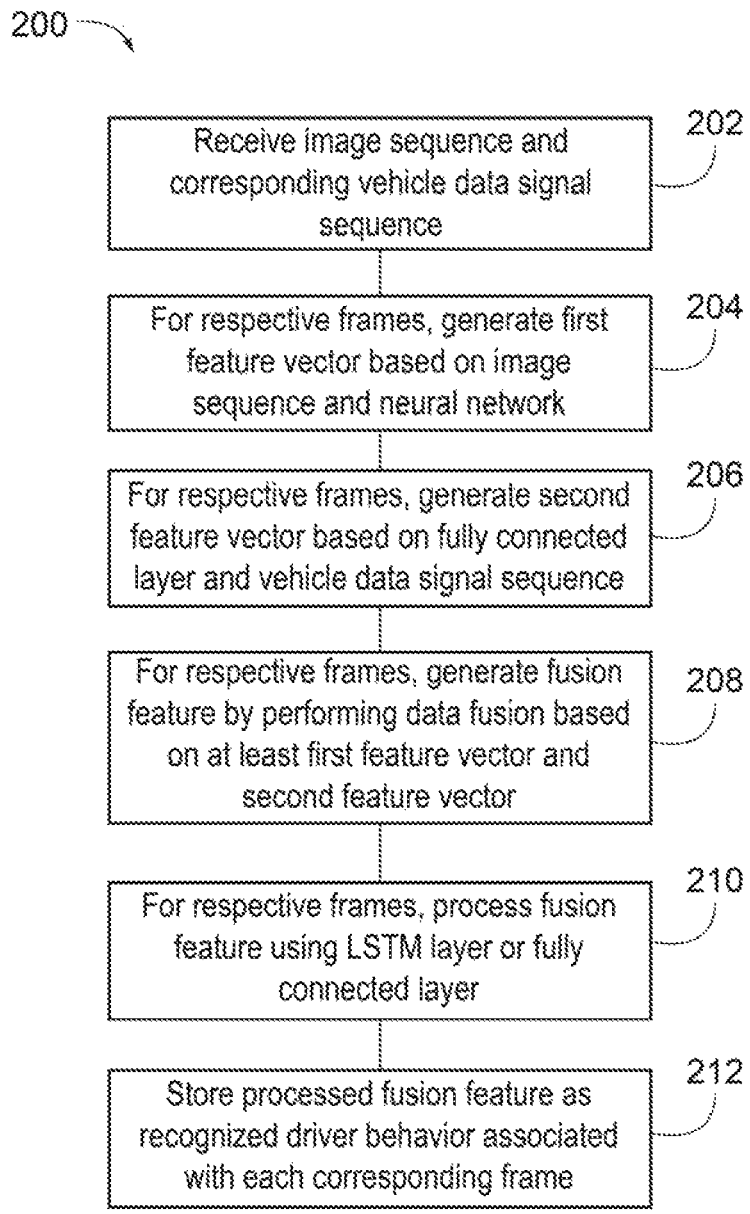
FIG. 2 is an exemplary flow diagram of a method for driver behavior recognition, according to one aspect.

FIG. 2 is an exemplary flow diagram of a method 200 for driver behavior recognition, according to one aspect. The method 200 may include receiving 202 an image sequence and a corresponding vehicle data signal sequence. The image sequence may include at least a first image frame and a second image frame. The vehicle data signal sequence may include vehicle data associated with the first image frame and vehicle data associated with the second image frame. The method 200 may include, for each frame of the respective sequences, generating a first feature vector 204 based on the image sequence and a first neural network, generating a second feature vector 206 based on a fully connected layer and the vehicle data signal sequence, generating a fusion feature 208 by performing data fusion based on the first feature vector and the second feature vector, processing the fusion feature 210 using a LSTM layer or a fully connected layer, and storing 212 the processed fusion feature as a recognized driver behavior associated with each corresponding frame.

Figure 5:
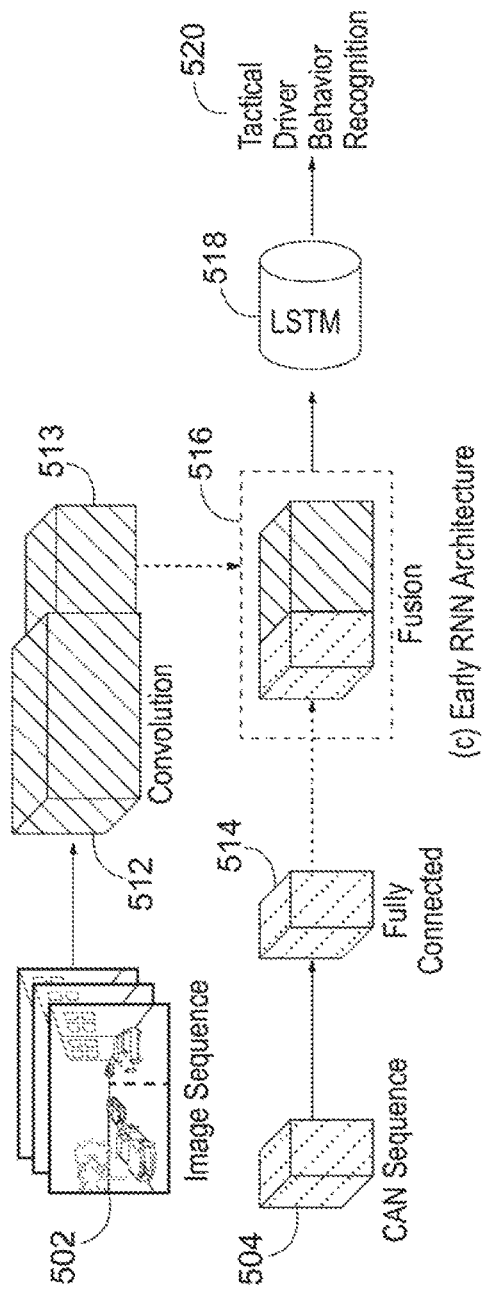
FIG. 5 is an exemplary architecture which may be implemented according to the system for driver behavior recognition of FIG. 1.
Figure 6:
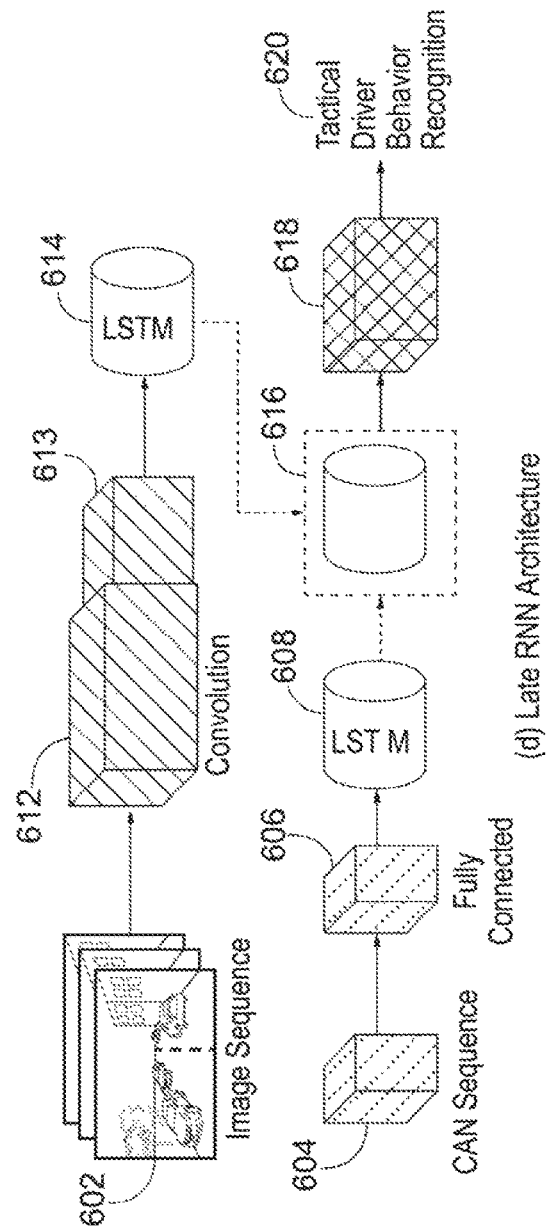
FIG. 6 is an exemplary architecture which may be implemented according to the system for driver behavior recognition of FIG. 1.
Figure 7:
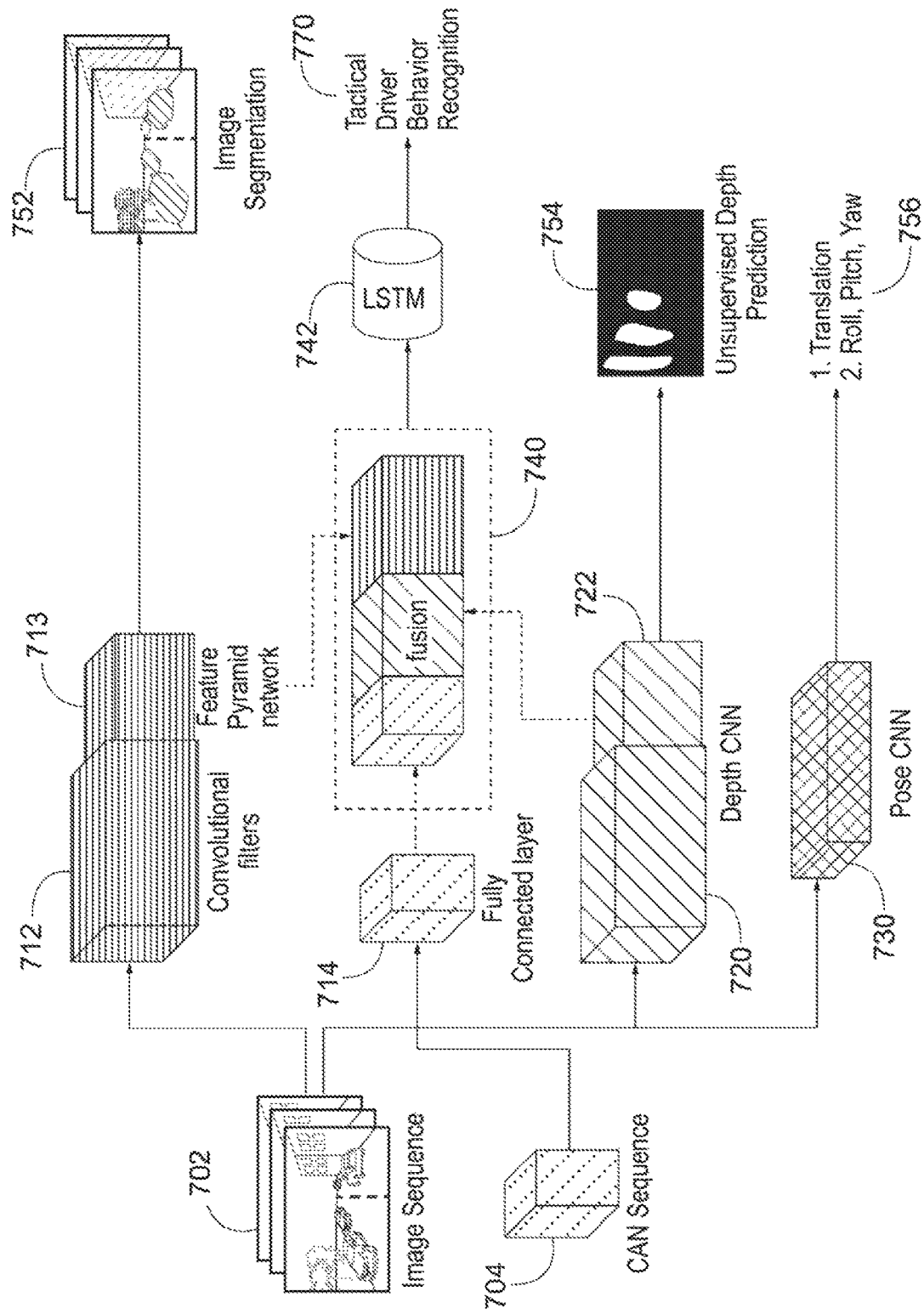
FIG. 7 is an exemplary architecture which may be implemented according to the system for driver behavior recognition of FIG. 1.

FIGS. 3-7 are exemplary architectures which may be implemented according to the system 100 for driver behavior recognition of FIG. 1. According to one aspect, different multimodal fusion architectures may be implemented using the image capture device 106 or camera and vehicle sensor data from the CAN bus 128 for tactical driver behavior detection. FIGS. 3-4 illustrate exemplary architectures based on CNN (e.g., using 2D convolutions and a fully connected layer) while FIGS. 5-6 illustrate exemplary architectures based on RNN. FIGS. 3 and 5 illustrate exemplary architectures based on early data fusion (e.g., generating a feature vector from the convolutor 110 based on not using an output layer of the CNN) while FIGS. 4 and 6 illustrate exemplary architectures based on late data fusion (e.g., generating a feature vector from the convolutor 110 based on the output layer and a fully connected layer or an LSTM layer). FIGS. 3-6 are two-stream architectures which fuse two feature vectors to form a fusion feature, while FIG. 7 is a three-stream architecture which fuses three feature vectors to form the fusion feature. An increase of the overall performance by 8% over a baseline model was observed during experimentation when the semantic context features were incorporated into the framework.

FIG. 3 is an exemplary architecture which may be implemented according to the system 100 for driver behavior recognition of FIG. 1. An image sequence 302 and a CAN sequence 304 are received as inputs to this architecture, via the memory 104, for example. The image sequence 302 may be fed into a CNN including a first portion 312 and a second portion 313. The first feature vector may be generated based on an intermediate representation or processing of the CNN from 313, rather than having an output layer of the CNN process the first feature vector. The CAN sequence 304 may be fed through a fully connected layer 314 (e.g., a first fully connected layer 314) to generate a second feature vector. The data fuser 116 may perform data fusion and generate a fusion feature 316. The fusion feature may be fed through a second fully connected layer 318, which may result in the tactical driver behavior recognition data 320, which may be utilized to build the database, as previously discussed. In FIG. 3, the second fully connected layer 318 provided after the data fusion of the fusion feature 316 results in no temporal information being considered in generating the recognized driver behavior. In this regard, the architecture of FIG. 3 may be a per frame action classification network that takes the image frame and CAN bus vehicle data of a current time step as inputs. The second fully connected layer 318 of FIG. 3 may output a same number of features as the LSTM layer of FIG. 5 to facilitate a comparison against the baseline model.

FIG. 4 is an exemplary architecture which may be implemented according to the system 100 for driver behavior recognition of FIG. 1. The vehicle data signal 404 sequence may be passed through the first fully connected layer 406 and a second fully connected layer 408 to generate the second feature vector. As seen in FIG. 4, the first feature vector may be generated based on the image sequence 402, the first neural network, which may be a CNN, including a first portion 412 and a second portion 413, and a third fully connected layer 414 through which the output of the CNN unit is passed (e.g., thereby using the output layer of the CNN 412, 413 rather than merely the intermediary layers 412), prior to data fusion 416. In FIG. 4, the processor 102 may process the fusion feature using a fourth fully connected layer 418, which may result in the tactical driver behavior recognition data 420, which may be utilized to build the database, as previously discussed. Conversely, in FIG. 5, which is based on RNN architecture, the processor 102 may process the fusion feature using the LSTM layer.

FIG. 5 is an exemplary architecture which may be implemented according to the system 100 for driver behavior recognition of FIG. 1. In FIG. 5, the memory 104 may receive the image sequence 502. The vehicle data signal sequence 504 may be received from the CAN bus 128 and stored to the memory 104. In this example, the image sequence 502 may represent the 3D scene structure information and the vehicle data signal sequence 504 may represent the vehicle dynamics information. The semantic context information may be derived by the convolutor 110, which may be implemented by the processor 102, resulting in semantic context features (e.g., a feature vector or the first feature vector). The vehicle data signal sequence 504 may be fed, by the processor 102, through a fully connected layer 514, which generates the second feature vector. The data fuser 116 may perform data fusion or data concatenation to fuse 516 or concatenate the first feature vector and the second feature vector. As previously described, different types of data fusion may be performed. The data fuser 116 may thus generate the fusion feature by performing data fusion based on the first feature vector and the second feature vector. The fusion feature may be passed through, via the processor 102, an LSTM layer 518, thereby generating the tactical driver behavior recognition result 520, which may be a recognized driver behavior associated with a corresponding image sequence frame. In this way, the architecture of FIG. 5 fuses an image feature vector with a vehicle data vector by concatenation, and passes the fusion feature through the LSTM layer (via the LSTM unit 122) for classification. As seen in FIG. 5, the first feature vector may not necessarily be generated by passing the image frames of the image sequence 502 completely through the CNN, including a first portion 512 and a second portion 513. Rather, merely an intermediate product of the CNN 512 may be utilized to generate the first feature vector so as to not utilize the output layer of the CNN 512, 513.

According to one aspect, the image sequence 502 includes a set of synchronized images and the vehicle data signal sequence 504 may be received from the CAN bus 128 and include CAN sensor signals corresponding to the synchronized images captured by the image capture device 106. The processor 102 may sample image frames from the image sequence and corresponding vehicle data from the vehicle data signal sequence 504 at a number of frames per second (fps), such as 3 fps. The vehicle data signal sequence 504 may be sampled or downsampled at a corresponding rate. In other words, the vehicle data signal sequence 504 may be downsampled from 100 Hz to 3 Hz to match the sampling rate from the image sequence 502. From the sampled image frames, the processor 102 may extract an image representation from the Conv2d_7b_1×1 layer (e.g., a layer or hidden layer of a CNN of the convolutor 110) of InceptionResnetV2 pre-trained on ImageNet (e.g., a pre-trained CNN). In this example, the features may be convolved with a 1×1 convolution to reduce the dimensionality from 8×8×1536 to 8×8×20. Raw sensor signals or the vehicle data signals from the vehicle data signal sequence 504 may be passed through the fully connected layer 514 to obtain a one dimensional feature vector which may be further concatenated at 516 with the image feature vector.

The concatenated features may be fed, by the LSTM unit 122, into the LSTM layer 518 to encode a history of past measurements. Batches of sequence segments may be formed by sequentially iterating over multiple driving sessions during a training phase. In this regard, the last LSTM hidden state from a previous batch may be utilized to initialize a LSTM hidden state on a next or subsequent step. The training may be performed based on truncated back propagation through time. To account for a class imbalance between foreground classes and background classes, techniques for training object proposal networks where positive and negative proposals are highly imbalanced may be implemented.

According to one aspect, the LSTM layer 518 may use batches of size 40 with each sequence length set to 90 samples. The dropout keep probability on the input and output of the LSTM may be set to 0.9. Experiments may be performed by changing one aspect of the architecture at a time to demonstrate efficiencies of each architecture from FIGS. 3-6. Two sets of experiments were performed. One experiment explores the benefit of late fusion versus early fusion. Another experiment explores the benefit of CNN versus RNN. Based on these experiments, the architecture of FIG. 7 was derived, and the image features were further enhanced with rich structural and contextual information.

FIG. 6 is an exemplary architecture which may be implemented according to the system 100 for driver behavior recognition of FIG. 1. In FIG. 6, two LSTM layers are utilized. A first LSTM layer 641 may be utilized to capture temporal features of image frames from the image sequence 602 while a fully connected layer 606 and a second LSTM layer 608 may be utilized to capture temporal features of the CAN sequence or the vehicle data signal sequence 604. In this regard, the first feature vector may be generated based on the image sequence 602, the first neural network including a first portion 612 and a second portion 613, and the second LSTM layer 614. After these temporal features of the image frames and the vehicle data are captured, these feature vectors may be fused 616 on a per image frame basis and passed through a fully connected layer 618 for behavior classification 620. The framework or architecture of FIG. 6 may result in the capturing of motion cues of each modality rather than encoding temporal features after the multi-modal fusion layer. As seen, FIG. 4 was similarly structured, except using the additional fully connected layers rather than LSTM layers, resulting in the CNN architecture. According to one aspect, one or more of the fully connected layers of FIGS. 3-6 may be interchanged with one or more convolutional filter layers and/or vice versa.

FIG. 7 is an exemplary architecture which may be implemented according to the system 100 for driver behavior recognition of FIG. 1. In FIG. 7, the exemplary architecture introduces a unified representation learning framework that incorporates 3D semantic scene context and multi-modal cues for tactical driver behavior detection. Unsupervised learning may be implemented from motion features, such as from the image sequence from a video feed, for example. Depth and camera motion may be estimated. A two-stream convolution network including depth (e.g., Depth CNN) and pose (e.g., Pose CNN) may be trained via supervision from a synthesis objective.

In FIG. 7, a proposed unified representation learning framework combines a semantic context, 3D scene structure, and vehicle dynamics for tactical driver behavior detection. Additionally, different fusion schemes may be implemented. According to one aspect, one or more penultimate features of the Depth CNN stream are used as the input to the proposed fusion framework. The features may be of size 23×40×256 and may be concatenated with the CAN bus features and may be sent downstream for processing by a LSTM layer. For semantic context, a Feature Pyramid Network may be incorporated to enrich features at a higher resolution. Features from one of the feature pyramids may be selected to match the dimension of the depth features.

An image sequence 702 and a CAN sequence 704 are received as inputs to this architecture, via the memory 104, for example. The image sequence 702 may be fed into a CNN, including a first portion 712 and a second portion 713 which may be a feature pyramid network 713. The output of the CNN 712, 713 as a whole may result in image segmentation 752, while an intermediate result of the CNN 712, 713 may be utilized as the first feature vector. In this regard, the first feature vector may be generated based on an intermediate representation or processing of the CNN from 713, rather than having an output layer of the CNN process the first feature vector. The image sequence 702 may be fed through a depth CNN 720, 722, resulting in an unsupervised depth prediction 754. The CAN sequence 704 may be fed through a fully connected layer 714 to generate a second feature vector. According to one aspect, 714 may be a convolutional filter layer rather than the fully connected layer. An intermediate result of this depth CNN 720, 722 may be used to generate the third feature vector. Additionally, the image sequence 702 may be fed through a pose CNN 730, resulting in pose data 756.

The data fuser 116 may perform data fusion and generate a fusion feature 740. The fusion feature 740 may be fed through a LSTM layer 742, which may result in the tactical driver behavior recognition data 770, which may be utilized to build the database, as previously discussed.

According to one aspect, the data fusion may include concatenating ImageNet features along with features of semantic segmentation, and the vehicle data CAN bus signals. According to another aspect, the ImageNet features may be removed and excluded because most of the contextual scene information may already be embedded by the semantic segmentation features.

Figure 8:
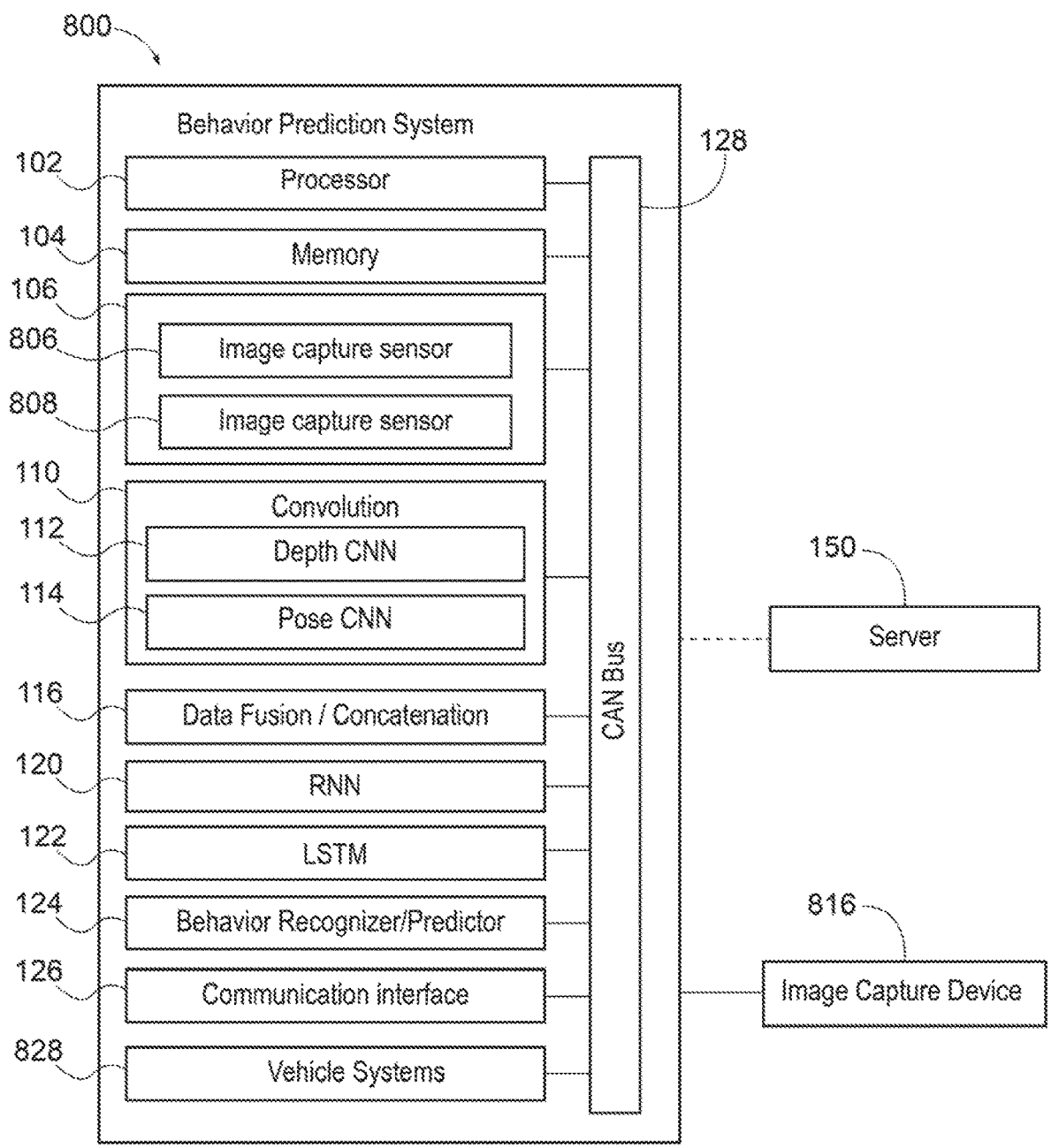
FIG. 8 is an exemplary block diagram of a system for driver behavior recognition and/or driver behavior prediction, according to one aspect.

FIG. 8 is an exemplary block diagram of a system 800 for driver behavior recognition and/or driver behavior prediction, which may be equipped on a vehicle, according to one aspect. The system 800 for driver behavior recognition/prediction may include a processor 102, a memory 104, and an image capture device 106, which may include multiple image capture sensors 806, 808 according to one aspect. According to another aspect, an external image capture device 816 may be communicatively coupled to the system 800 for driver behavior recognition/prediction. The system 800 for driver behavior recognition/prediction may include a convolutor 110 or CNN unit. The convolutor 110 may include one or more processing layers, one or more convolution layers, one or more fully connected layers, one or more hidden layers, etc. The convolutor 110 may include a depth CNN 112, a pose CNN 114, among other types of CNNs. The system 800 for driver behavior recognition/prediction may include a data fuser 116 or a concatenator, an RNN unit 120, an LSTM unit 122, a behavior recognizer/predictor 124, a communication interface 126, and one or more vehicle systems 828. The CAN bus 128 may be communicatively coupled to the above described components and facilitate computer communication therebetween.

As described above, the external image capture device 816 may be communicatively coupled to the system 800 for driver behavior recognition/prediction. Additionally, a server 150 may also be communicatively coupled to the system 800 for driver behavior recognition/prediction via the communication interface 126 or CAN bus 128.

According to one aspect, the image capture device 106 may be a dual dash-cam device including the first image capture sensor 806 and the second image capture sensor 808. The first image capture sensor 806 may be a forward-facing camera of the vehicle capturing a first image sequence of the operating environment through which the vehicle is travelling. The second image capture sensor 808 may be a rear-facing camera of the vehicle capturing a second image sequence of a driver or operator of the vehicle, thereby capturing operator actions, reactions, operator gaze locations, operator head pose, facial expressions, etc.

According to another aspect, the image capture device 106 of the system 800 for driver behavior recognition/prediction may merely include a single image capture sensor 806 or 808 capturing either the first image sequence or the second image sequence and the external image capture device 816 may capture the other, missing image sequence. For example, if a vehicle is merely equipped with a forward-facing dash-cam, the forward-facing dash-cam may be utilized to receive the first image sequence of the operating environment while the external image capture device 816 may be utilized to receive the second image sequence of the driver or operator of the vehicle. Alternatively, if the vehicle is merely equipped with a rear-facing driver-cam, the rear-facing driver-cam may be utilized to receive the second image sequence of the driver or operator of the vehicle, while the external image capture device 816 may be utilized to receive or capture the first image sequence of the operating environment through which the vehicle is travelling.

The external image capture device 816 may be a separate device, such as a mobile device or smartphone interfaced to be in computer communication with the system 800 for driver behavior recognition/prediction via the communication interface 126, for example. Ultimately, regardless of how the first image sequence and the second image sequence are captured or received, both may be utilized as inputs to the system 800 for driver behavior recognition/prediction in either a two-stream architecture or a three-stream architecture, as will be described with reference to FIGS. 10-14. Additionally, as described above, the processor 102 may sample frames from respective sequences to have a matching sampling rate or down sample frames from one or more of the streams so that different streams have matching frames numbers for analysis and/or processing.

In this regard, the processor 102 may generate one or more feature vectors based on one or more of the input sequences. Stated another way, the processor 102 may generate a first feature vector, a second feature vector, a third feature vector, a fourth feature vector, etc. A feature vector, as used herein, may include one or more processed frames of the respective sequence utilized to generate the corresponding feature vector. In other words, because each sequence includes a set of frames, and because a sequence is utilized to generate the feature vector, the resultant feature vector may include a set of processed frames. The processor 102 may generate these respective feature vectors based on one or more of the input sequences (e.g., the first image sequence, the second image sequence, and/or the CAN data or vehicle data signal sequence) and one or more neural network layers or one or more processing layers. Examples of neural network layers or processing layers may include a convolution filter layer, a fully connected layer, a LSTM layer, a hidden layer, a feature pyramid network layer, a depth CNN layer, a pose CNN layer, etc.

As described above, the first image sequence may include at least a first image frame and a second image frame (e.g., and further, a third image frame, a fourth image frame, etc.). The second image sequence may include at least a first image frame and a second image frame (e.g., and further, a third image frame, a fourth image frame, etc.). The vehicle data signal sequence may include vehicle data associated with the first image frame of the first image sequence and vehicle data associated with the second image frame of the first image sequence or otherwise vehicle data associated with each image frame of the first image sequence. The memory 104 may receive (from the image capture device 106 and/or the external image capture device 816) one or more of the first image sequence, the second image sequence, and the corresponding vehicle data signal sequence (which may correspond to either the first image sequence, the second image sequence, or both the first image sequence and the second image sequence).

According to one aspect, the convolutor 110, implemented via the processor 102, may generate the first feature vector based on the first image sequence and a first neural network, which may be a CNN or a RNN. Further, the convolutor 110 may generate the first feature vector such that the first image sequence is passed through one or more neural network layers or one or more processing layers (e.g., a convolution filter layer, a fully connected layer, a LSTM layer, a hidden layer, a feature pyramid network layer, a depth CNN layer, a pose CNN layer, an input layer, an output layer, etc.) prior to and/or after passing through the first neural network.

According to one aspect, the processor 102 may generate the second feature vector based on the vehicle data signal sequence and one or more processing layers, such as a fully connected layer or a convolutional filter layer.

According to one aspect, the depth CNN unit 112, implemented via the processor 102, may generate the third feature vector based on the first image sequence and a depth CNN. Further, the depth CNN unit 112 may generate the first feature vector such that the first image sequence is passed through one or more neural network layers or one or more processing layers (e.g., a convolution filter layer, a fully connected layer, a LSTM layer, a hidden layer, a feature pyramid network layer, a depth CNN layer, a pose CNN layer) prior to and/or after passing through the depth CNN.

According to one aspect, the convolutor 110, implemented via the processor 102, may generate the fourth feature vector based on the second image sequence and a second neural network, which may be a CNN or a RNN. Further, although not shown in FIGS. 10-14, the convolutor 110 may generate the fourth feature vector such that the second image sequence is passed through one or more neural network layers or one or more processing layers (e.g., a convolution filter layer, a fully connected layer, a LSTM layer, a hidden layer, a feature pyramid network layer, a depth CNN layer, a pose CNN layer) prior to and/or after passing through the second neural network.

The data fuser 116 may be implemented via the above described two-stream architecture or three-stream architecture by performing data fusion (e.g., addition or concatenation) on two or more feature vectors. For example, when the first image sequence and the second image sequence are utilized as inputs to the system 800 for driver behavior recognition/prediction, the data fuser 116 may generate the fusion feature by performing data fusion based on the first feature vector (e.g., the feature vector associated with the first image sequence) and the second feature vector (e.g., the feature vector associated with the second image sequence), thereby resulting in the two-stream architecture implementation of the system 800 for driver behavior recognition/ prediction. As another example, when the first image sequence, the corresponding vehicle data signal sequence, and the second image sequence are utilized as inputs to the system 800 for driver behavior recognition/prediction, the data fuser 116 may generate the fusion feature by performing data fusion based on the first feature vector (e.g., associated with the first image sequence), the second feature vector (e.g., associated with the vehicle data signal sequence), the third feature vector (e.g., associated with the first image sequence and the depth CNN), and the fourth feature vector (e.g., associated with the second image sequence), thereby resulting in the three-stream architecture implementation of the system 800 for driver behavior recognition/prediction.

For example, if the first image sequence depicts the vehicle drifting left, and heading into a lane to the left of a current lane, the second image sequence includes the driver turning the steering wheel to the left, and the vehicle data signal sequence includes a change in the steering angle, the processor 102 may determine a left lane change as the driver behavior recognition action. Other examples of the driver behavior recognition action may include a lane change, lane branching, a merging action, cross-walk passing, etc.

According to one aspect, the fusion feature may be processed via the behavior recognizer 124 of the processor 102, which may pass the fusion feature through one or more neural network layers or one or more processing layers (e.g., a convolution filter layer, a fully connected layer, a LSTM layer, etc.). In this regard, the processed fusion feature may be stored in the memory 104 as a recognized driver behavior associated with each corresponding frame. For example, the first image sequence may include n image frames. In this example, the behavior recognizer 124 of the processor 102 may generate n resultant frames of the recognized driver behavior based on the n image frames of the first image sequence.

According to one aspect, the behavior predictor 124 may be implemented via the processor 102 and may generate a predicted driver behavior. The behavior predictor 124 may generate the predicted driver behavior by processing the fusion feature using a LSTM layer to generate more resultant frame than the n input image frames. Stated again, the LSTM layer provided by the LSTM unit 122 enables the behavior predictor 124 to take any number of inputs and produce any number of outputs. Explained another way, the first image sequence is the one of the inputs to the system 800 for driver behavior prediction, and may include n image frames. However, the LSTM layer of the LSTM unit 122 may enable the behavior predictor 124 to generate the predicted driver behavior by generating n+x resultant frames for the predicted driver behavior based on the n image frames of the first image sequence. In this example, x may be a number of prediction frames for the predicted driver behavior while the first n resultant frames may be the recognized driver behavior of the n input image frames. The x prediction frames may be indicative of a predicted driver behavior generated based on the two or three input streams, as described above.

According to one aspect, the vehicle system 828 may operate, or perform an action based on the predicted driver behavior associated with the x corresponding prediction frames. For example, the vehicle system 828 may be an advanced driver-assistance systems (ADAS) which may implement an automated steering or deceleration action to mitigate an anticipated collision, alert the driver of a potential collision, provide warnings, automatically engage an autonomous driving mode for the vehicle, automate lighting, provide or engage an adaptive cruise control, engaged in a collision avoidance action, generate a traffic notification, connect a smartphone, contact an emergency contact, engage in a lane departure warning mode or action, provide automatic lane centering, highlight an obstacle on a display or a HUD, etc.

As another example, when the predicted driver behavior is a lane change, (e.g., the inferred "intention" of the driver is the lane change), if, using a rear facing camera, it is determined that the blind spot has not been checked by the driver yet or that the driver is inattentive of vehicles in an adjacent lane, the vehicle system 828 may initiate ADAS control by taking control and performing an evasive maneuver or activating a warning system regarding a risk associated with the lane change which is inferred as about to be performed by the driver. Therefore, the system 800 for driver behavior recognition and/or driver behavior prediction may include an "action specific" warning/mitigation system, which may be enabled based on an attention of the driver with regard to a specific monitored area, a risk, a risk threshold, the predicted action, a predicted result associated with the predicted action, etc. In other words, the warning or evasive maneuvering aspect may not necessarily always be active or present to the driver.

Further, the information displayed on the HUD vehicle system may be masked or filtered according to the predicted driver behavior. For example, if the driver is predicted to maintain his or her current lane by the behavior predictor 124, the processor 102 may remove displayed information from the HUD relating to blind spot indicators, for example.

Figure 9:
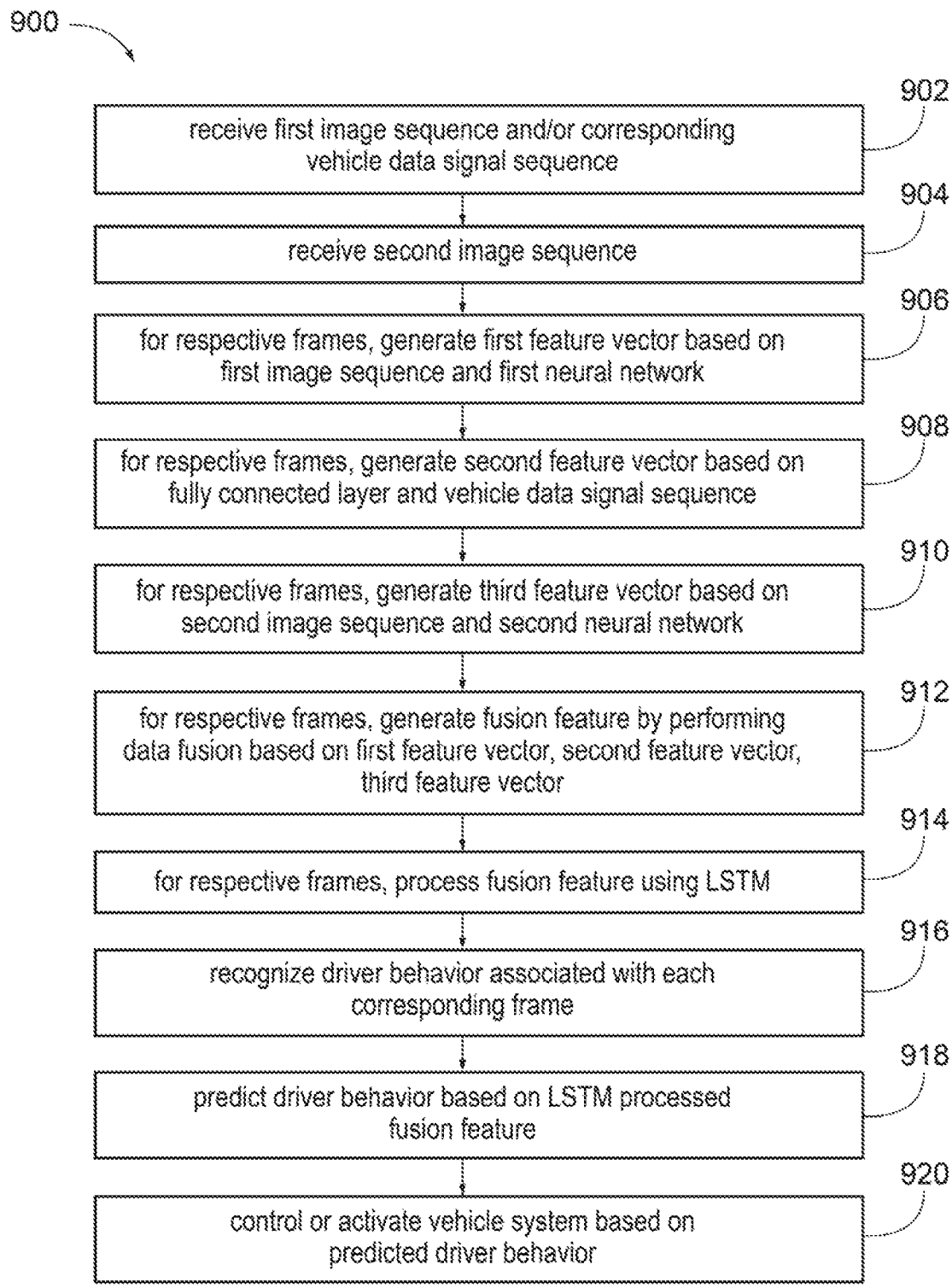
FIG. 9 is an exemplary flow diagram of a method for driver behavior recognition and/or driver behavior prediction, according to one aspect.

FIG. 9 is an exemplary flow diagram of a method 900 for driver behavior recognition and/or driver behavior prediction, according to one aspect. The method 900 for driver behavior recognition and/or driver behavior prediction may include receiving a first image sequence and/or a corresponding vehicle data signal sequence at 902. According to one aspect, the corresponding vehicle data signal sequence is received, while according to another aspect, the corresponding vehicle data signal sequence is not received or utilized. At 904, the method 900 for driver behavior recognition and/or driver behavior prediction may include receiving a second image sequence. The first image sequence may be from a forward-facing image capture device 806 of a vehicle and may include image frames of an operating environment through which the vehicle is travelling. The second image sequence may be received from a rear-facing image capture device 808 within a vehicle and may include image frames of a driver of the vehicle.

The method 900 for driver behavior recognition and/or driver behavior prediction may include performing, for respective frames of respective sequences, generating a first feature vector 906 based on the first image sequence and a first neural network, generating a second feature vector 908 based on a fully connected layer and the vehicle data signal sequence, generating a third feature vector 910 based on the second image sequence and a second neural network, generating a fusion feature 912 by performing data fusion based on the first feature vector, the second feature vector, and the third feature vector. This fusion feature may be processed 914 using an LSTM. At 916, the method 900 for driver behavior recognition and/or driver behavior prediction may include recognizing a driver behavior associated with each corresponding frame. At 918, the method 900 may include predicting a driver behavior based on LSTM processed fusion feature. This may be achieved by processing the fusion feature using the LSTM layer to generate n+x resultant frames of a predicted driver behavior based on n image frames of the first image sequence. In this example, x may be a number of prediction frames. The method 900 for driver behavior recognition and/or driver behavior prediction may include controlling, activating, or operating a vehicle system 920 based on the predicted driver behavior. Examples of controlling, activating, or operating the vehicle system 828 may include activating a lane change vehicle system, providing a notification on a heads-up-display (HUD), or providing an automated or corrective driving or steering action, etc.

FIGS. 10-14 are exemplary three-stream architectures (e.g., receiving a first image sequence 1004 from the forward-facing image capture device 806, a second image sequence 1002 from the rear, driver-facing image capture device 808, and the CAN sequence 1006) which may be implemented according to the system 800 for driver behavior recognition/prediction of FIG. 8. It will be appreciated that, according to some aspects, fusion may be achieved without the data from the CAN sequence 1006, which results in a two-stream architecture (e.g., receiving a first image sequence 1004 from the forward-facing image capture device 806 and a second image sequence 1002 from the rear, driver-facing image capture device 808) rather than the three-stream architecture. As described herein, feeding or processing of image sequences or CAN sequence 1006s through neural networks or processing layers (e.g., convolution layers, fully connected layers, LSTM layers, etc.) may be performed by the processor 102 of the system 800 for driver behavior recognition/prediction of FIG. 8. Further, the early versus late fusion may be denoted by whether the feature vector is generated based on the processing layer is implemented after an image sequence is fed through a neural network.

Figure 10:
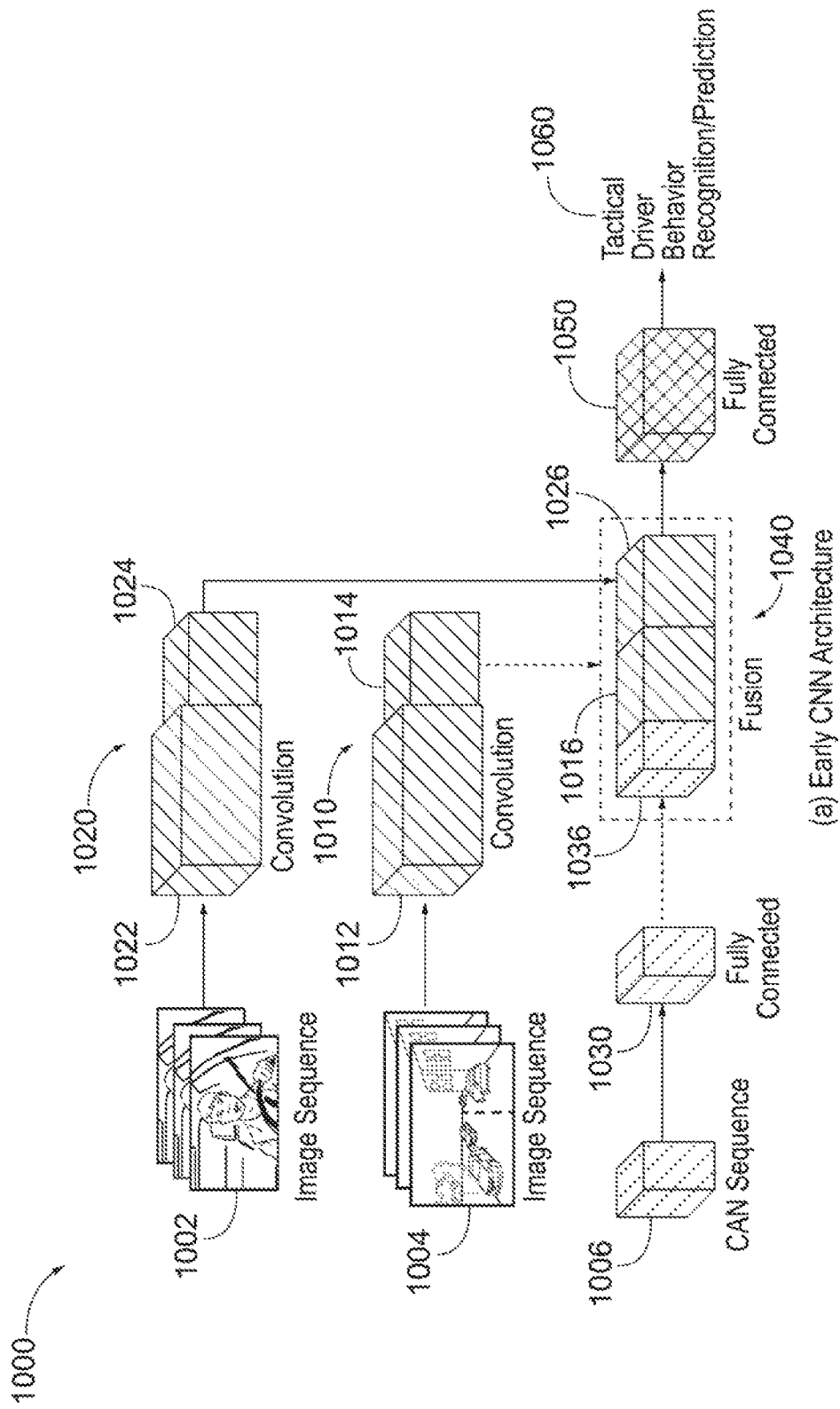
FIG. 10 is an exemplary architecture which may be implemented according to the system for driver behavior recognition/prediction of FIG. 9.

In this regard, FIG. 10 is an exemplary architecture 1000 which may be implemented according to the system 800 for driver behavior recognition/prediction of FIG. 8. In FIG. 10, a first image sequence 1004 may be received by the memory 104 from the first image capture sensor 806. In other words, the first image capture sensor 806 may capture the first image sequence 1004 and pass this first image sequence 1004 on to the memory 104. Similarly, the second image capture sensor 808 may capture a second image sequence 1002 and pass this second image sequence 1002 on to the memory 104. The CAN bus 128 may capture or receive the CAN sequence 1006 from one or more of the vehicle systems 828, such as a brake vehicle system, a steering vehicle system, an acceleration vehicle system, etc.

The first image sequence 1004 may be fed, one frame at a time, through a first CNN 1010, including a first portion 1012 of layers and a second portion 1014 of layers to produce or generate a first feature vector 1016. According to one aspect the first feature vector 1016 may be generated or derived in a manner such that the first feature vector 1016 is an intermediate product of the first CNN. Stated another way, the first CNN may include one or more neural network layers or one or more processing layers (e.g., an input layer, one or more intermediate layers, a convolution filter layer, a fully connected layer, a hidden layer, a feature pyramid network layer, an output layer, etc.) and the first feature vector 1016 may be generated based merely on one or more of the intermediate layers of the first CNN rather than all layers of the first CNN. Explained yet another way, the first feature vector 1016 may be generated based on the first portion 1012, but not based on the second portion 1014, for example. In this way, the first feature vector 1016 may not necessarily be passed through or calculated based on the output layer of the first CNN. Because the first feature vector 1016 is generated in this way, the architecture 1000 of FIG. 10 is considered an early CNN architecture.

The second image sequence 1002 may be fed, one frame at a time, through a second CNN 1020, including a first portion 1022 of layers and a second portion 1024 of layers to produce or generate a second feature vector 1026. As previously discussed, the second image sequence may include operator actions, reactions, operator gaze locations, the operator head pose, facial expressions, etcs. The CAN sequence 1006 may be fed, one frame at a time, through a fully connected layer 1030 to produce or generate a third feature vector 1036. The data fuser 116 or concatenator may perform data fusion on two or more of the first feature vector 1016, the second feature vector 1026, and the third feature vector 1036. This may result in a fusion feature vector 1040. The fusion feature vector 1040 may be passed through a fully connected layer 1050, thereby generating a tactical driver behavior recognition/prediction result 1060 for respective frames.

Figure 11:
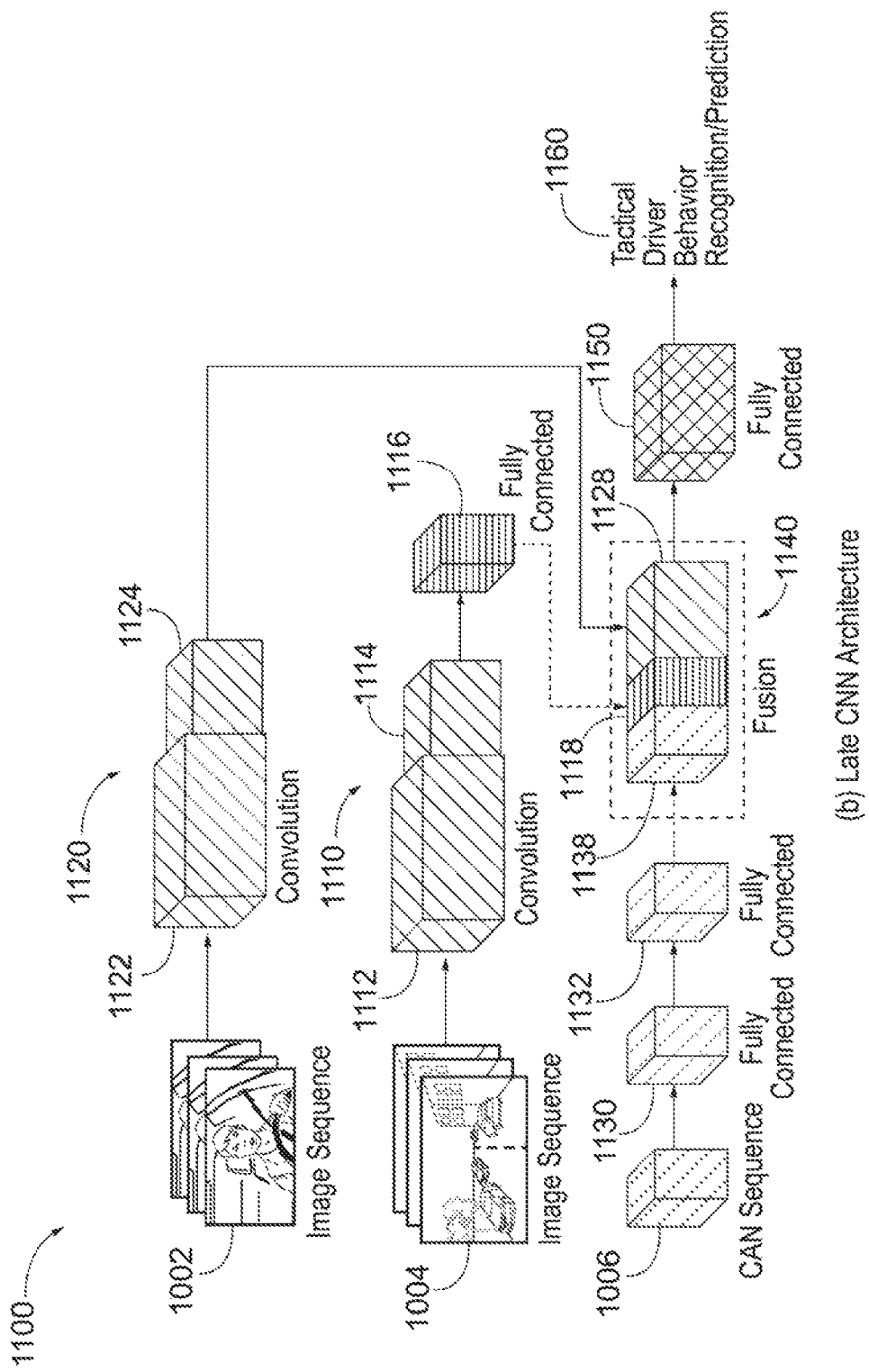
FIG. 11 is an exemplary architecture which may be implemented according to the system for driver behavior recognition/prediction of FIG. 9.

FIG. 11 is an exemplary architecture 1100 which may be implemented according to the system 800 for driver behavior recognition/prediction of FIG. 8. In FIG. 11, the first image capture sensor 806 may capture the first image sequence 1004 and pass this first image sequence 1004 on to the memory 104, the second image capture sensor 808 may capture the second image sequence 1002 and pass this second image sequence 1002 on to the memory 104, and the CAN bus 128 may capture or receive the CAN sequence 1006 from one or more of the vehicle systems 828. The first image sequence 1004 may be fed, one frame at a time, fully through a first CNN 1110, including a first portion 1112 of layers, a second portion 1114 of layers, and a fully connected layer 1116 to produce or generate a first feature vector 1118. Because the first feature vector 1118 is generated in this way according to this aspect, the architecture 1100 of FIG. 11 is considered a late CNN architecture.

The second image sequence 1002 may be fed, one frame at a time, through a second CNN 1120, including a first portion 1122 of layers and a second portion 1124 of layers to produce or generate a second feature vector 1128. The CAN sequence 1006 may be fed, one frame at a time, through one or more fully connected layers 1130, 1132, etc. to produce or generate a third feature vector 1138. The data fuser 116 or concatenator may perform data fusion on two or more of the first feature vector 1118, the second feature vector 1128, and the third feature vector 1138. This may result in a fusion feature vector 1140. The fusion feature vector 1140 may be passed through a fully connected layer 1150, thereby generating a tactical driver behavior recognition/prediction result 1160 for respective frames.

Figure 12:
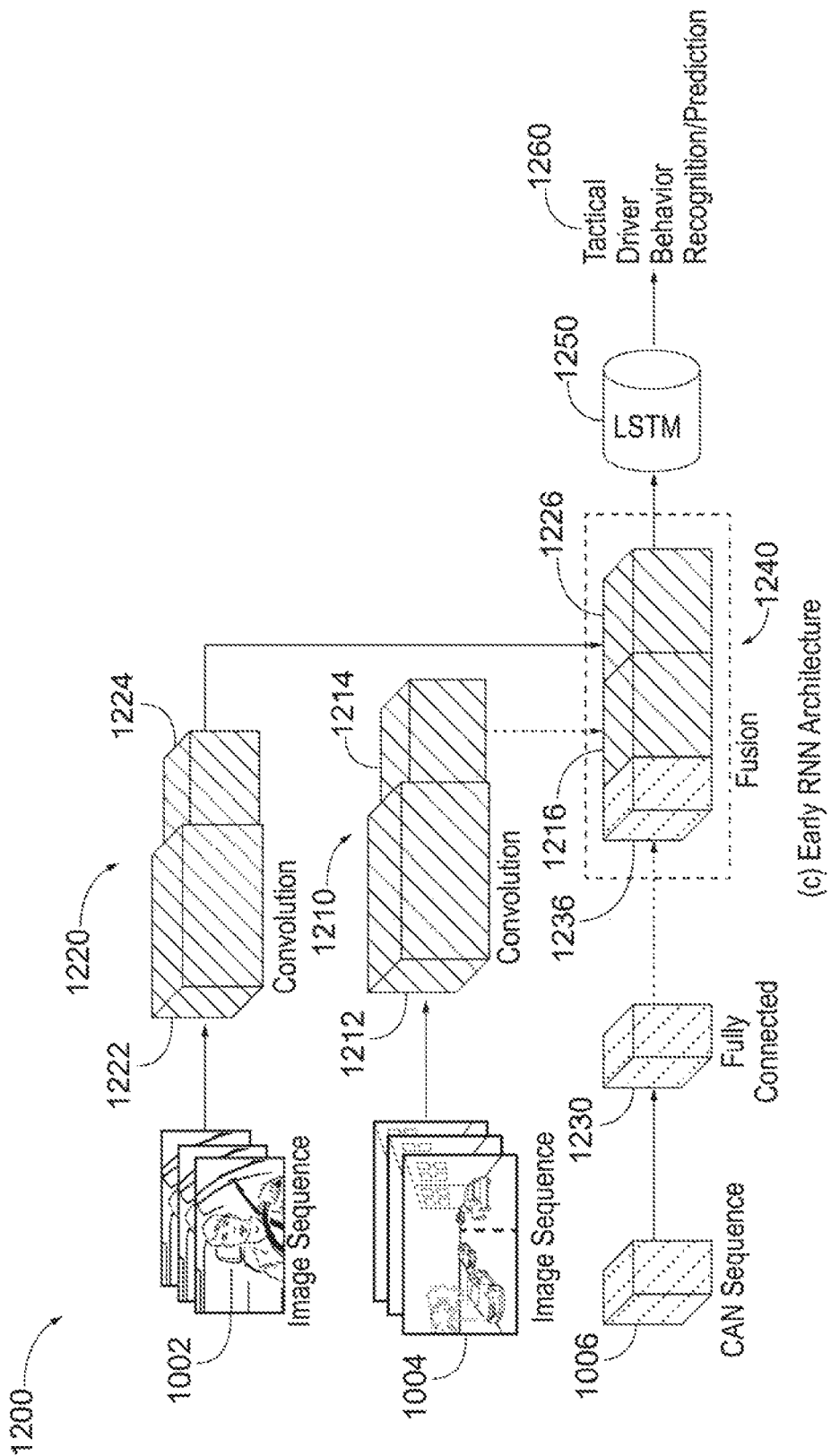
FIG. 12 is an exemplary architecture which may be implemented according to the system for driver behavior recognition/prediction of FIG. 9.

FIG. 12 is an exemplary architecture 1200 which may be implemented according to the system 800 for driver behavior recognition/prediction of FIG. 8. In FIG. 12, the first image capture sensor 806 may capture the first image sequence 1004 and pass this first image sequence 1004 on to the memory 104, the second image capture sensor 808 may capture the second image sequence 1002 and pass this second image sequence 1002 on to the memory 104, and the CAN bus 128 may capture or receive the CAN sequence 1006 from one or more of the vehicle systems 828. The first image sequence 1004 may be fed, one frame at a time, through a first CNN 1210, including a first portion 1212 of layers and a second portion 1214 of layers to produce or generate a first feature vector 1216. Similarly to FIG. 10, the first feature vector 1216 may be generated in an intermediate fashion (e.g., the first feature vector 1216 may not necessarily be passed through or calculated based on the output layer of the first CNN 1210 or the first feature vector 1216 may be generated based on the first portion 1212, but not based on the second portion 1214 of the first CNN 1210). Because the first feature vector 1216 is generated in this way and utilizes LSTM 1250, the architecture 1200 of FIG. 12 is considered an early RNN architecture.

The second image sequence 1002 may be fed, one frame at a time, through a second CNN 1220, including a first portion 1222 of layers and a second portion 1224 of layers to produce or generate a second feature vector 1226. The CAN sequence 1006 may be fed, one frame at a time, through a fully connected layer 1230 to produce or generate a third feature vector 1236. The data fuser 116 or concatenator may perform data fusion on two or more of the first feature vector 1216, the second feature vector 1226, and the third feature vector 1236. This may result in a fusion feature vector 1240. The fusion feature vector 1240 may be passed through a LSTM layer 1250, thereby generating a tactical driver behavior recognition/prediction result 1260 for respective frames.

Figure 13:
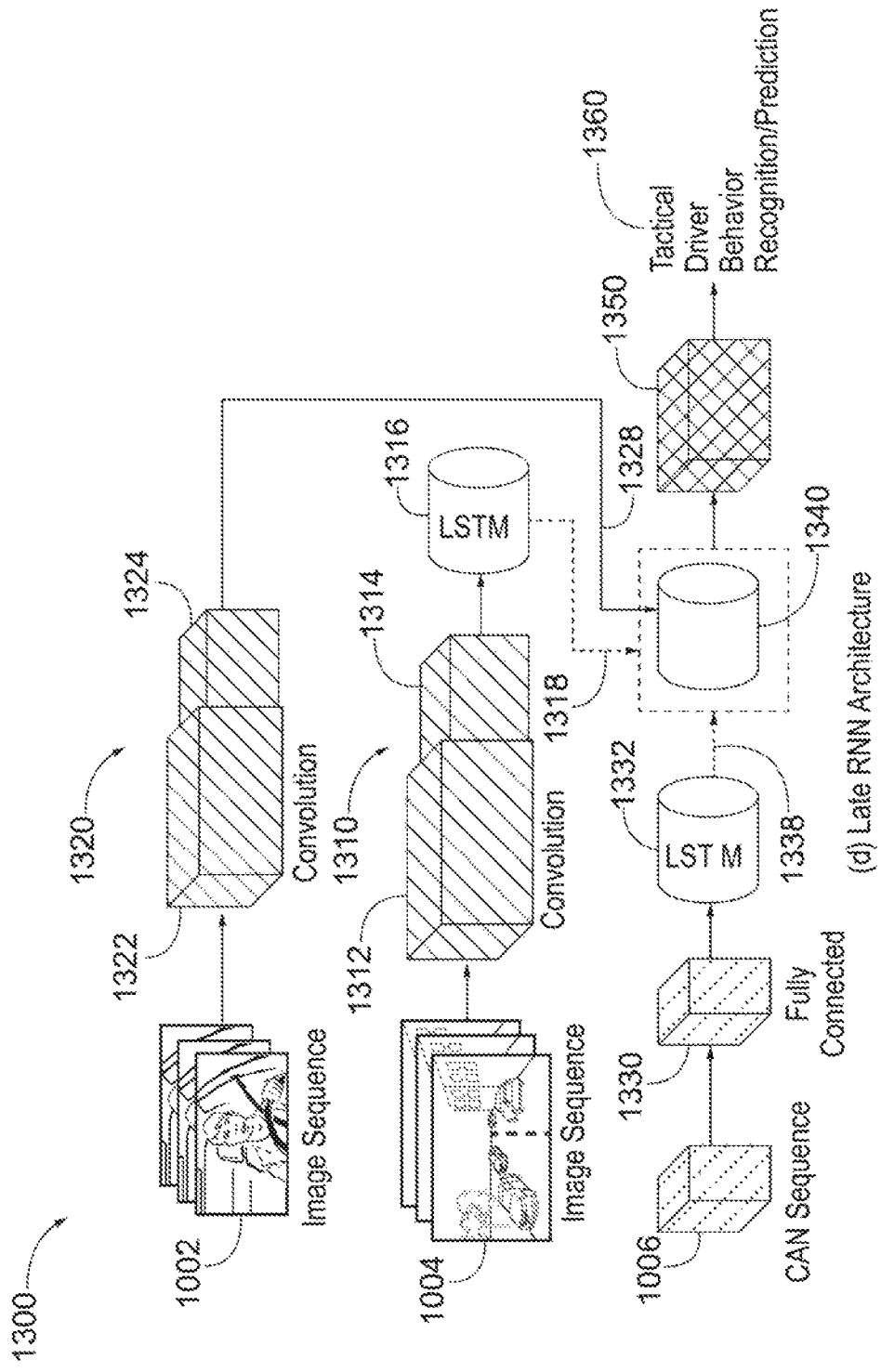
FIG. 13 is an exemplary architecture which may be implemented according to the system for driver behavior recognition/prediction of FIG. 9.

FIG. 13 is an exemplary architecture 1300 which may be implemented according to the system 800 for driver behavior recognition/prediction of FIG. 8. In FIG. 13, the first image capture sensor 806 may capture the first image sequence 1004 and pass this first image sequence 1004 on to the memory 104, the second image capture sensor 808 may capture the second image sequence 1002 and pass this second image sequence 1002 on to the memory 104, and the CAN bus 128 may capture or receive the CAN sequence 1006 from one or more of the vehicle systems 828. The first image sequence 1004 may be fed, one frame at a time, fully through a first CNN 1310, including a first portion 1312 of layers, a second portion 1314 of layers, and a LSTM layer 1316 to produce or generate a first feature vector 1318. Because the first feature vector 1318 is generated in this way, the architecture 1300 of FIG. 13 is considered a late RNN architecture.

The second image sequence 1002 may be fed, one frame at a time, through a second CNN 1320, including a first portion 1322 of layers and a second portion 1324 of layers to produce or generate a second feature vector 1328. The CAN sequence 1006 may be fed, one frame at a time, through a fully connected layer 1330, a LSTM layer 1332 to produce or generate a third feature vector 1338. The data fuser 116 or concatenator may perform data fusion on two or more of the first feature vector 1318, the second feature vector 1328, and the third feature vector 1338. This may result in a fusion feature vector 1340. The fusion feature vector 1340 may be passed through an additional layer 1350, such as a LSTM layer and/or a fully connected layer, thereby generating a tactical driver behavior recognition/prediction result 1360 for respective frames.

Figure 14:
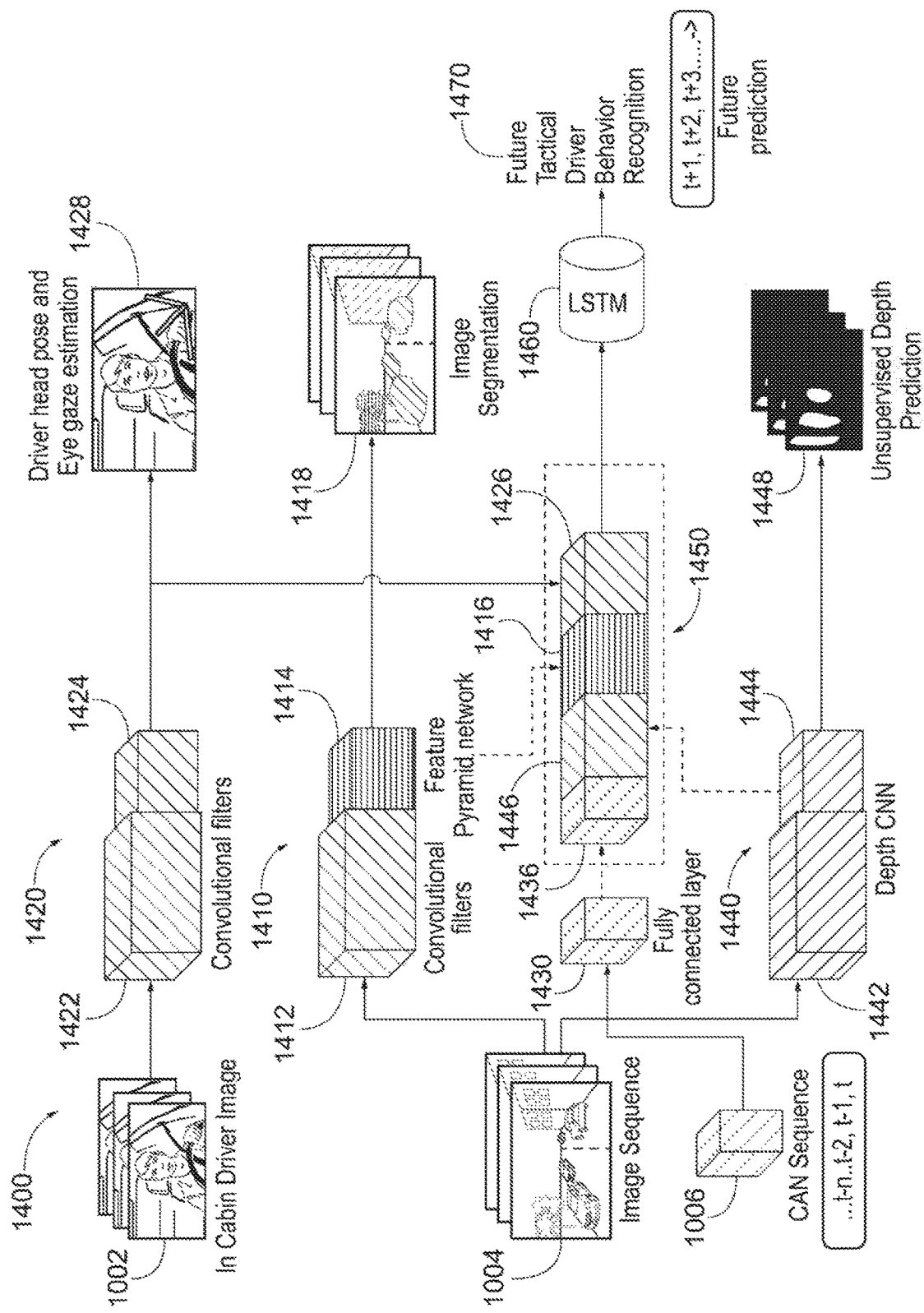
FIG. 14 is an exemplary architecture which may be implemented according to the system for driver behavior recognition/prediction of FIG. 9.

FIG. 14 is an exemplary architecture 1400 which may be implemented according to the system 800 for driver behavior recognition/prediction of FIG. 8. In FIG. 14, the first image capture sensor 806 may capture the first image sequence 1004 and pass this first image sequence 1004 on to the memory 104, the second image capture sensor 808 may capture the second image sequence 1002 and pass this second image sequence 1002 on to the memory 104, and the CAN bus 128 may capture or receive the CAN sequence 1006 from one or more of the vehicle systems 828. The first image sequence 1004 may be fed, one frame at a time, through a first CNN 1410, such as by the convolutor 110, the depth CNN unit 112, or the pose CNN unit 114, including a first portion 1412 of layers and a second portion 1414 of layers to produce or generate a first feature vector 1416 associated with image segmentation 1418. The second image sequence 1002 may be fed, one frame at a time, through a second CNN 1420, including a first portion 1422 of layers and a second portion 1424 of layers to produce or generate a second feature vector 1426 associated with driver pose 1428, such as by the convolutor 110, the depth CNN unit 112, or the pose CNN unit 114. The CAN sequence 1006 may be fed, one frame at a time, through a fully connected layer 1430 to produce or generate a third feature vector 1436. The second image sequence 1002 may be fed, one frame at a time, through a depth CNN 1440, including a first portion 1442 of layers and a second portion 1444 of layers to produce or generate a fourth feature vector 1446 associated with unsupervised depth prediction 1448. The data fuser 116 or concatenator may perform data fusion on two or more of the first feature vector 1416, the second feature vector 1426, the third feature vector 1436, and the fourth feature vector 1446. This may result in a fusion feature vector 1450. The fusion feature vector 1450 may be passed through a LSTM layer 1460, thereby generating a tactical driver behavior recognition/prediction result 1470 for respective frames. Any of the CNNs or neural networks discussed herein may include a pyramid feature network. Further, any of the inputs and/or outputs to any of the CNNs, RNNs, LSTM layers, and/or neural networks may be modified by the addition of one or more processing layers, such as a fully connected layer, a convolutional filter layer, a LSTM layer, etc.

Figure 15:
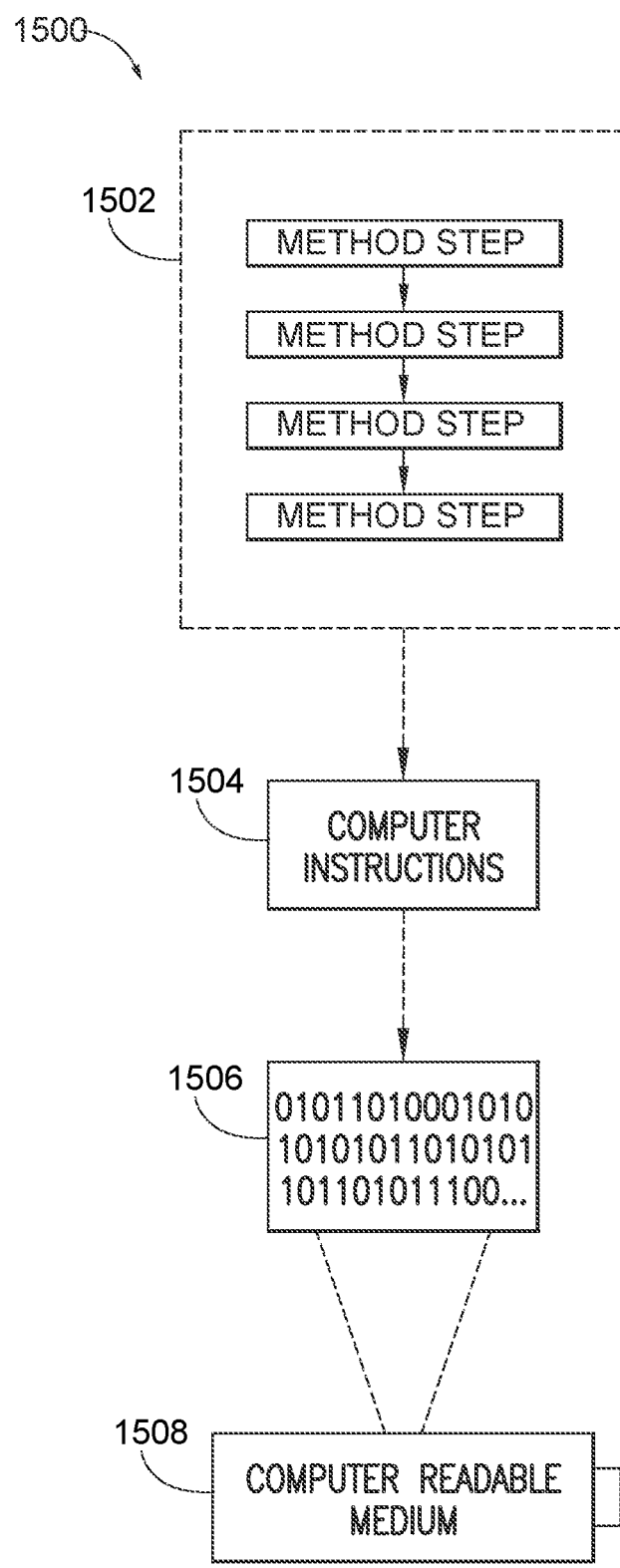
FIG. 15 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 15, wherein an implementation 1500 includes a computer-readable medium 1508, such as a CD-R, DVD-R, flash drive, a platter of a hard disk drive, etc., on which is encoded computer-readable data 1506. This encoded computer-readable data 1506, such as binary data including a plurality of zero's and one's as shown in 1506, in turn includes a set of processor-executable computer instructions 1504 configured to operate according to one or more of the principles set forth herein. In this implementation 1500, the processor-executable computer instructions 1504 may be configured to perform a method 1502, such as the method 200 of FIG. 2 or the method 900 of FIG. 9. In another aspect, the processor-executable computer instructions 1504 may be configured to implement a system, such as the system 100 of FIG. 1 or the system 800 of FIG. 8. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 16:
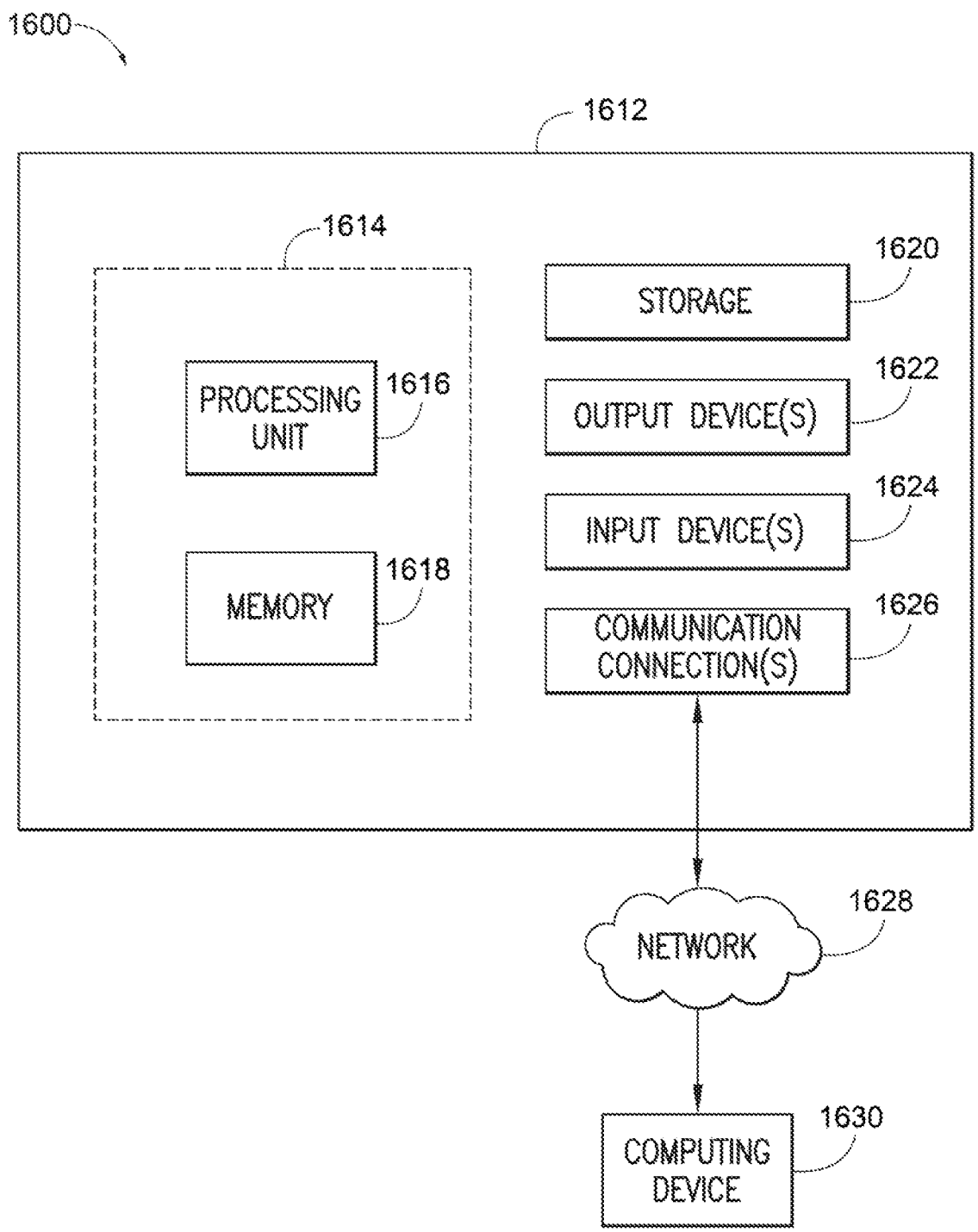
FIG. 16 is an illustration of an example computing environment where one or more of the provisions set forth herein are implemented, according to one aspect.

FIG. 16 and the following discussion provide a description of a suitable computing environment to implement aspects of one or more of the provisions set forth herein. The operating environment of FIG. 16 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 16 illustrates a system 1600 including a computing device 1612 configured to implement one aspect provided herein. In one configuration, the computing device 1612 includes at least one processing unit 1616 and memory 1618. Depending on the exact configuration and type of computing device, memory 1618 may be volatile, such as RAM, non-volatile, such as ROM, flash memory, etc., or a combination of the two. This configuration is illustrated in FIG. 16 by dashed line 1614.

In other aspects, the computing device 1612 includes additional features or functionality. For example, the computing device 1612 may include additional storage such as removable storage or non-removable storage, including, but not limited to, magnetic storage, optical storage, etc. Such additional storage is illustrated in FIG. 16 by storage 1620. In one aspect, computer readable instructions to implement one aspect provided herein are in storage 1620. Storage 1620 may store other computer readable instructions to implement an operating system, an application program, etc. Computer readable instructions may be loaded in memory 1618 for execution by processing unit 1616, for example.

The term "computer readable media" as used herein includes computer storage media. Computer storage media includes volatile and nonvolatile, removable and non-removable media implemented in any method or technology for storage of information such as computer readable instructions or other data. Memory 1618 and storage 1620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 1612. Any such computer storage media is part of the computing device 1612.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 1612 includes input device(s) 1624 such as keyboard, mouse, pen, voice input device, touch input device, infrared cameras, video input devices, or any other input device. Output device(s) 1622 such as one or more displays, speakers, printers, or any other output device may be included with the computing device 1612. Input device(s) 1624 and output device(s) 1622 may be connected to the computing device 1612 via a wired connection, wireless connection, or any combination thereof. In one aspect, an input device or an output device from another computing device may be used as input device(s) 1624 or output device(s) 1622 for the computing device 1612. The computing device 1612 may include communication connection(s) 1626 to facilitate communications with one or more other devices 1630, such as through network 1628, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for driver behavior prediction, comprising:
an image capture sensor configured to capture a first image sequence and a second image sequence;
a vehicle sensor configured to capture a corresponding vehicle data signal sequence which corresponds to the image sequence;
a memory configured to receive the first image sequence, the second image sequence, and the corresponding vehicle data signal sequence,
wherein the first image sequence includes a number of image frames of at least a first image frame and a second image frame and the second image sequence includes at least a first image frame and a second image frame;
a processor, for each image frame of the image sequence, configured to:
generate a first feature vector based on the first image sequence and a first neural network;
generate a second feature vector based on the second image sequence and a second neural network;
generate a fusion feature by performing data fusion based on the first feature vector and the second feature vector; and
process the fusion feature using a long short term memory (LSTM) layer to generate one or more resultant frames of a predicted driver behavior based on the number of image frames of the first image sequence by analyzing the fusion feature including the first feature vector indicative of image segmentation of the image sequence and the second feature vector indicative of vehicle data;
communicate the predicted driver behavior to the memory; and
a vehicle system configured to operate based on the predicted driver behavior.

2. The system for driver behavior prediction of claim 1, wherein the first neural network or the second neural network is a convolutional neural network (CNN) or a recurrent neural network (RNN).

3. The system for driver behavior prediction of claim 1, wherein:
the first neural network includes an input layer, an output layer, and one or more hidden layers;
the second neural network includes an input layer, an output layer, and one or more hidden layers.

4. The system for driver behavior prediction of claim 3, wherein the first feature vector is not passed through or calculated based on the output layer of the first neural network.

5. The system for driver behavior prediction of claim 1, wherein the first image sequence is received from a forward-facing image capture device of a vehicle and includes image frames of an operating environment through which the vehicle is travelling.

6. The system for driver behavior prediction of claim 1, wherein the second image sequence is received from a rear-facing image capture device within a vehicle and includes image frames of a driver of the vehicle.

7. A method for driver behavior prediction, comprising:
capturing, via an image sensor, a first image sequence and a second image sequence;
capturing, via a vehicle sensor, a corresponding vehicle data signal sequence which corresponds to the image sequence;
receiving, via a memory, the first image sequence, the second image sequence, and the corresponding vehicle data signal sequence,
wherein the first image sequence includes a number of image frames of at least a first image frame and a second image frame and the second image sequence includes at least a first image frame and a second image frame;
generating, via a processor, a first feature vector based on the first image sequence and a first neural network;
generating, via the processor, a second feature vector based on the second image sequence and a second neural network;
generating, via the processor, a fusion feature by performing data fusion based on the first feature vector and the second feature vector; and
processing the fusion feature, via the processor, using a long short term memory (LSTM) layer to generate one or more resultant frames of a predicted driver behavior based on the number of image frames of the first image sequence by analyzing the fusion feature including the first feature vector indicative of image segmentation of the image sequence and the second feature vector indicative of vehicle data;
communicating the predicted driver behavior to the memory; and
a vehicle system operating based on the predicted driver behavior.

8. The method for driver behavior prediction of claim 7, wherein the first neural network or the second neural network is a convolutional neural network (CNN) or a recurrent neural network (RNN).

9. The method for driver behavior prediction of claim 7, wherein:
the first neural network includes an input layer, an output layer, and one or more hidden layers;
the second neural network includes an input layer, an output layer, and one or more hidden layers.

10. The method for driver behavior prediction of claim 9, wherein the first feature vector is not passed through or calculated based on the output layer of the first neural network.

11. The method for driver behavior prediction of claim 7, wherein the first image sequence is received from a forward-facing image capture device of a vehicle and includes image frames of an operating environment through which the vehicle is travelling.

12. The method for driver behavior prediction of claim 7, wherein the second image sequence is received from a rear-facing image capture device within a vehicle and includes image frames of a driver of the vehicle.

13. A system for driver behavior prediction, comprising:
an image capture sensor configured to capture a first image sequence and a second image sequence;
a vehicle sensor configured to capture a corresponding vehicle data signal sequence which corresponds to the image sequence;
a memory configured to receive the first image sequence, the second image sequence, and the corresponding vehicle data signal sequence,
wherein the first image sequence is received from a forward-facing image capture device of a vehicle,
wherein the second image sequence is received from a rear-facing image capture device within the vehicle,
wherein the first image sequence includes a number of image frames of at least a first image frame and a second image frame and the second image sequence includes at least a first image frame and a second image frame;
a processor, for each image frame of the image sequence, configured to:
generate a first feature vector based on the first image sequence and a first neural network;
generate a second feature vector based on the second image sequence and a second neural network;
generate a fusion feature by performing data fusion based on the first feature vector and the second feature vector; and
process the fusion feature using a long short term memory (LSTM) layer to generate one or more resultant frames of a predicted driver behavior based on the number of image frames of the first image sequence by analyzing the fusion feature including the first feature vector indicative of image segmentation of the image sequence and the second feature vector indicative of vehicle data;
communicate the predicted driver behavior to the memory; and
a vehicle system configured to operate based on the predicted driver behavior.

14. The system for driver behavior prediction of claim 13, wherein the first neural network or the second neural network is a convolutional neural network (CNN) or a recurrent neural network (RNN).

15. The system for driver behavior prediction of claim 13, wherein:
the first neural network includes an input layer, an output layer, and one or more hidden layers;
the second neural network includes an input layer, an output layer, and one or more hidden layers.

16. The system for driver behavior prediction of claim 15, wherein the first feature vector is not passed through or calculated based on the output layer of the first neural network.

17. The system for driver behavior prediction of claim 13, wherein the first image sequence includes image frames of an operating environment through which the vehicle is travelling.

18. The system for driver behavior prediction of claim 13, wherein the second image sequence includes image frames of a driver of the vehicle.

19. The system for driver behavior prediction of claim 13, wherein the performing data fusion includes performing addition.

20. The system for driver behavior prediction of claim 13, wherein the performing data fusion includes performing concatenation.

* * * * *